United States Patent
Kumagai

(10) Patent No.: US 7,274,631 B2
(45) Date of Patent: Sep. 25, 2007

(54) OPTICAL-DISC DRIVING APPARATUS, OPTICAL-DISC DRIVING METHOD, STORAGE MEDIUM, AND PROGRAM

(75) Inventor: Eiji Kumagai, Kanagawa (JP)

(73) Assignee: Sony Corporation (JP)

( * ) Notice: Subject to any disclaimer, the term of this patent is extended or adjusted under 35 U.S.C. 154(b) by 572 days.

(21) Appl. No.: 10/926,887

(22) Filed: Aug. 26, 2004

(65) Prior Publication Data

US 2005/0052966 A1 Mar. 10, 2005

(30) Foreign Application Priority Data

Sep. 4, 2003 (JP) ............... P2003-312887

(51) Int. Cl.
*G11B 7/00* (2006.01)
(52) U.S. Cl. .................. 369/44.32; 369/53.19
(58) Field of Classification Search ............. 369/44.32, 369/53.19, 53.14, 53.12
See application file for complete search history.

(56) References Cited

U.S. PATENT DOCUMENTS 6,493,296 B1 * 12/2002 Fukumoto et al. ....... 369/44.32

FOREIGN PATENT DOCUMENTS

| JP | 63-133324 A | 6/1988 |
|---|---|---|
| JP | 09-007207 A | 1/1997 |
| JP | 2003-141761 A | 5/2003 |
| JP | 2003-162836 A | 6/2003 |

* cited by examiner

*Primary Examiner*—Nabil Hindi
(74) *Attorney, Agent, or Firm*—Lerner, David, Littenberg, Krumholz & Mentlik, LLP

(57) ABSTRACT

An optical-disc driving apparatus for an optical disc includes a pickup; a detection unit for detecting a traverse signal by differential push-pull (DPP) detection for every radial tilt angle within a first range, the radial tilt angle being measured between the optical disc and the pickup; a determination unit for determining the radial tilt angle corresponding to a traverse signal within a second range including a maximum value among the detected traverse signals; and a control unit for controlling the orientation of the pickup with respect to the optical disc based on the determined radial tilt angle. The optical-disc driving apparatus controls driving of the optical disc based on the traverse signal by DPP detection generated from a preceding beam, a main beam, and a succeeding beam.

11 Claims, 20 Drawing Sheets

FIG. 8
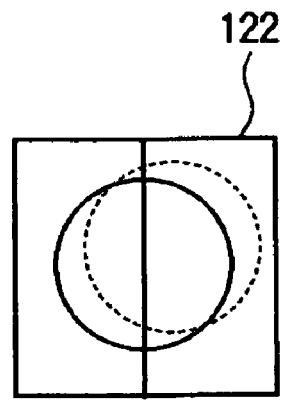
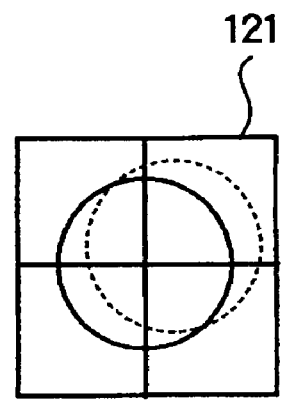
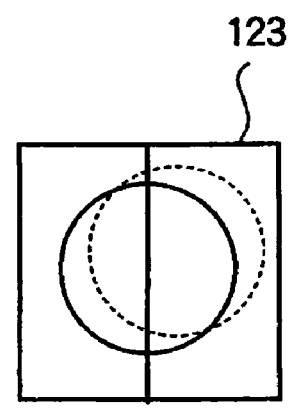

OPTICAL-DISC DRIVING APPARATUS, OPTICAL-DISC DRIVING METHOD, STORAGE MEDIUM, AND PROGRAM

BACKGROUND OF THE INVENTION

1. Field of the Invention

The present invention relates to optical-disc driving apparatuses, optical-disc driving methods, storage media, and programs. More particularly, the present invention relates to an optical-disc driving apparatus and an optical-disc driving method capable of reliably controlling an optical disc, a storage medium, and a program.

2. Description of the Related Art

A driving apparatus for driving an optical disc, which is a storage medium, irradiates an optical disc with a light beam for reading or writing. This light beam is ideally perpendicular to the surface of the optical disc.

However, if the optical disc has radial skew or the like, the angle between the surface of the optical disc and the optical axis of an objective lens in an optical pickup in the driving apparatus is shifted from perpendicular. As a result, the light beam is incident on the surface of the optical disc at an angle shifted from perpendicular, thus causing an aberration in the light beam.

With any aberration, when data is recorded on the optical disc, record marks are not appropriately formed on the optical disc. When data is read out from the optical disc, the signal-to-noise (S/N) ratio of a playback signal is degraded due to an increase in crosstalk or the like, thus causing a jitter.

As described above, if the optical disc has radial skew or the like, the function of the optical-disc driving apparatus is significantly damaged.

In order to correct an aberration due to a tilt of the optical axis, the objective lens is tilted in the radial direction to reduce in aberration and to inhibit an occurrence of a jitter of a playback signal.

A known driving apparatus having a tilt adjustment mechanism for tilting the objective lens in the radial direction includes, in its optical pickup body, a tilt sensor, such as an infrared sensor, for converting radial skew into a voltage. The driving apparatus is driven such that the optical axis of the objective lens in the optical pickup in the driving apparatus is perpendicular to the surface of the optical disc by driving the tilt adjustment mechanism based on the converted voltage.

When the optical disc is tilted with respect to the optical axis with the objective lens being in tracking control, a differential amplifier outputs signals corresponding to the tilt and the amplitudes of the pit signals are varied depending on the tilt. A known optical device detects a tilt without a tilt sensor by observing such signals by using a control circuit (for example, refer to Japanese Unexamined Patent Application Publication No. 2001-291257). With this device, since a DC offset does not occur due to a tilt in a tracking servo control, the stability of a tracking control system against a tilt can be improved only by correcting a decrease in pit depth caused by the tilt by using a variable gain amplifier.

Furthermore, a known optical disc device detects a disc tilt or a lens tilt at which a push-pull signal of a photo-sensor has a maximum amplitude at an arbitrary position on the radius of the optical disc (for example, refer to Japanese Unexamined Patent Application Publication No. 2003-141761). In the optical disc device, a light beam from a laser diode is converted into a parallel light beam by a collimator lens, the parallel light beam is reflected by a reflective mirror in the direction of an objective lens, the reflected light beam is focused on the optical disc through the objective lens, and the light beam reflected from the optical disc is incident on the photo-sensor through the collimator lens and a polarization splitter. In recording or playing back of a signal, an amount of tilt (tilt angle) of the disc or lens is set in accordance with the position on the radius.

However, when a tilt sensor, such as an infrared sensor, is provided, it is necessary to calibrate the sensitivity or an offset voltage in advance. Accordingly, there are problems in that the adjustment is complicated and a practical accuracy cannot be attained and in that it is necessary to provide an additional tilt sensor in the optical pickup, thus undesirably raising the cost.

Furthermore, when no additional infrared sensor is provided, there is a problem in that a complicated process, such as a process of detecting the amplitude of a signal, is required.

SUMMARY OF THE INVENTION

The present invention provides, in its first aspect, an optical-disc driving apparatus including an optical disc; a pickup; a detection unit for detecting a traverse signal by differential push pull (DPP) detection for every radial tilt angle within a first range, the radial tilt angle being measured between the optical disc and the pickup; a determination unit for determining the radial tilt angle corresponding to a traverse signal within a second range including a maximum value among the detected traverse signals; and a control unit for controlling the orientation of the pickup with respect to the optical disc based on the determined radial tilt angle. The optical-disc driving apparatus controls driving of the optical disc based on the traverse signal by DPP detection generated from a preceding beam, a main beam, and a succeeding beam.

The detection unit may detect a maximum value of the traverse signal for every radial tilt angle within the first range from among values of the traverse signal during a predetermined period. The determination unit may determine the radial tilt angle corresponding to a traverse signal within the second range including a largest maximum value among the detected maximum values of the traverse signal.

The detection unit may detect the maximum value of the traverse signal for every radial tilt angle within the first range from among values of the traverse signal during one rotation of the optical disc.

The optical-disc driving apparatus further includes a selection unit for selecting either the traverse signal or an RF signal generated from the main beam in accordance with a type of the optical disc. It is preferable that the detection unit detect the traverse signal for every radial tilt angle within the first range when the traverse signal is selected and detect the RF signal for every radial tilt angle within the first range when the RF signal is selected. It is preferable that the determination unit determine the radial tilt angle corresponding to the traverse signal within the second range including the maximum value among the detected traverse signals when the traverse signal is selected and determine the radial tilt angle corresponding to an RF signal within a third range including a maximum value among the detected RF signals when the RF signal is selected.

The selection unit may select either the traverse signal or the RF signal in accordance with the type of the optical disc based on the number of layers on the optical disc, the reflectance of the optical disc, or the level of a traverse signal by push-pull detection.

The detection unit may detect the traverse signal for every radial tilt angle within the first range at an inner-circumference-side area on the optical disc and at an outer-circumference-side area thereon. The determination unit may determine the radial tilt angle corresponding to the traverse signal within the second range including the maximum value among the traverse signals at the inner-circumference-side area and the outer-circumference-side area. The control unit may control the orientation of the pickup with respect to the optical disc based on the radial tilt angles determined at the inner-circumference-side area and at the outer-circumference-side area.

The optical-disc driving apparatus further includes a storage unit for storing the radial tilt angles determined at the inner-circumference-side area and at the outer-circumference-side area. The control unit preferably controls the orientation of the pickup with respect to the optical disc based on the stored radial tilt angles.

The optical-disc driving apparatus further includes a calculation unit for calculating a radial tilt angle within another area based on the radial tilt angles determined at the inner-circumference-side area and at the outer-circumference-side area. The control unit preferably controls the orientation of the pickup with respect to the optical disc based on the radial tilt angles determined at the inner-circumference-side area and at the outer-circumference-side area or the calculated radial tilt angle within the other area.

The present invention provides, in its second aspect, a method of driving an optical disc in an optical-disc driving apparatus for controlling driving of the optical disc based on a traverse signal by DPP detection generated from a preceding beam, a main beam, and a succeeding beam. The method includes the steps of controlling detecting of the traverse signal by DPP detection for every radial tilt angle within a first range, the radial tilt angle being measured between the optical disc and a pickup; determining the radial tilt angle corresponding to a traverse signal within a second range including a maximum value among the detected traverse signals; and controlling the orientation of the pickup with respect to the optical disc based on the determined radial tilt angle.

The present invention provides, in its third aspect, a storage medium that stores a recorded computer-readable program for a process of controlling driving of an optical disc based on a traverse signal by DPP detection generated from a preceding beam, a main beam, and a succeeding beam. The program includes the steps of controlling detecting of the traverse signal by DPP detection for every radial tilt angle within a first range, the radial tilt angle being measured between the optical disc and a pickup; determining the radial tilt angle corresponding to a traverse signal within a second range including a maximum value among the detected traverse signals; and controlling the orientation of the pickup with respect to the optical disc based on the determined radial tilt angle.

The present invention provides, in its fourth aspect, a program causing a computer to perform a process of controlling driving of an optical disc based on a traverse signal by DPP detection generated from a preceding beam, a main beam, and a succeeding beam. The program includes the steps of controlling detecting of the traverse signal by DPP detection for every radial tilt angle within a first range, the radial tilt angle being measured between the optical disc and a pickup; determining the radial tilt angle corresponding to a traverse signal within a second range including a maximum value among the detected traverse signals; and controlling the orientation of the pickup with respect to the optical disc based on the determined radial tilt angle.

The optical-disc driving apparatus may be a standalone apparatus or may be a block for driving an optical disc in a recording-and-playback apparatus.

In the optical-disc driving apparatus, the method of driving an optical disc, the storage medium, and the program according to the present invention, the traverse signal by DPP detection is detected for every radial tilt angle between the optical disc and the pickup within the first range, and the radial tilt angle corresponding to the traverse signal within the second range including the maximum value among the detected traverse signals is determined. The orientation of the pickup with respect to the optical disc is controlled based on the determined radial tilt angle.

With the optical-disc driving apparatus, the method of driving an optical disc, the storage medium, and the program according to the present invention, it is possible to correct the tilt of the optical axis in the radial tilt direction with respect to the optical disc by a simpler process without requiring an additional sensor for detecting the tilt angle of the optical disc.

BRIEF DESCRIPTION OF THE DRAWINGS

FIG. 8 illustrates an effect of the aberration on the light beam;

DESCRIPTION OF THE PREFERRED EMBODIMENTS

Figure 1:
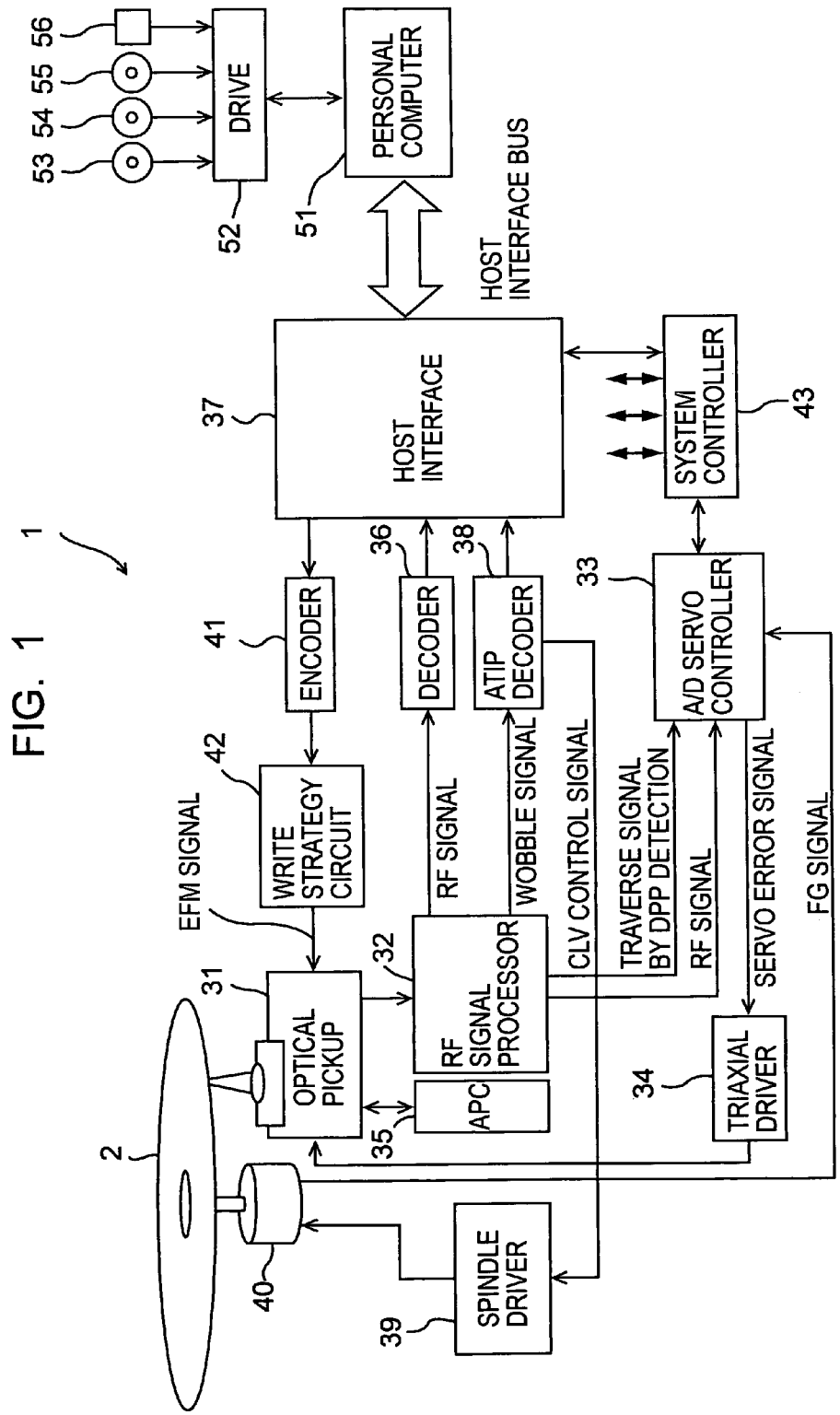
FIG. 1 is a block diagram showing the structure of an optical-disc driving apparatus according to an embodiment of the present invention.

An optical-disc driving apparatus of the present invention includes a detection unit (for example, an RF signal processor 32 in FIG. 1) for detecting a traverse signal by DPP detection for every radial tilt angle within a first range, the radial tilt angle being measured between an optical disc (for example, an optical disc 2 in FIG. 1) and a pickup (for example, an optical pickup 31 in FIG. 1); a determination unit (for example, an A/D servo controller 33 in FIG. 1) for determining the radial tilt angle corresponding to a traverse signal within a second range including a maximum value among the detected traverse signals; and a control unit (for example, a triaxial driver 34 in FIG. 1) for controlling the orientation of the pickup with respect to the optical disc based on the determined radial tilt angle.

FIG. 1 is a block diagram showing the structure of an optical-disc driving apparatus according to an embodiment of the present invention. An optical-disc recording-and-playback apparatus 1, which is an example of the optical-disc driving apparatus, drives a mounted optical disc 2 to record data on the optical disc 2 or to read data recorded on the optical disc 2 for playback.

Although the standalone optical-disc recording-and-playback apparatus 1 is exemplified, the present invention is not limited to the standalone apparatus. The optical-disc driving apparatus may be a unit for driving an optical disc in another apparatus, such as a driving unit in a personal computer or the like.

The optical disc 2 should be a storage medium on which data is recorded or from which data is read out by irradiating the optical disc 2 with a light beam. The optical disc 2 is, for example, a compact disc (CD) or a digital versatile disc (DVD). The DVD is a digital versatile disc read-only memory (DVD-ROM), a digital versatile disc recordable (DVD-R), a digital versatile disc rewritable (DVD-RW) (a common name of a DVD re-recordable disc), a DVD+R, or a DVD+RW. The DVD-ROM has one signal recording layer or two signal recording layers.

The optical-disc recording-and-playback apparatus 1 records data supplied from a personal computer 51, which is a host, on the mounted optical disc 2, or reads data recorded on the mounted optical disc 2 to supply the readout data to the personal computer 51.

The optical-disc recording-and-playback apparatus 1 includes components from an optical pickup 31 to a system controller 43. The optical pickup 3 irradiates the optical disc 2 with a light beam, detects the intensity of the light beam to generate a signal corresponding to the intensity, and supplies the generated signal to a radio-frequency (RF) signal processor 32.

The optical pickup 31, the RF signal processor 32, and a decoder 36 read information recorded on the optical disc 2. For example, the light beam, which is a laser beam and with which the optical pickup 31 irradiates the optical disc 2, focuses on the optical disc 2 through an objective lens. The optical pickup 31 detects the light beam reflected from the optical disc 2 and converts the light beam into an electrical signal. The RF signal processor 32 and the decoder 36 convert the electrical signal supplied from the optical pickup 31 into information.

For example, the optical pickup 31 splits up the laser beam into a plurality of light beams by using a grating. The split-up light beam is incident on the optical disc 2 as a main beam for scanning one track of the optical disc 2, a preceding beam for scanning an area that is adjacent to the track and ahead of the scanning direction of the main beam, or a succeeding beam for scanning another area that is adjacent to the track and behind the scanning direction of the main beam, based on the grating angle.

The optical pickup 31 detects intensities of the main beam, the preceding beam, and the succeeding beam reflected from the optical disc 2 to generate signals corresponding to the intensities of the main beam, the preceding beam, and the succeeding beam.

The RF signal processor 32 processes the signal supplied from the optical pickup 31 to generate a signal required by another component. For example, the RF signal processor 32 processes the signal supplied from the optical pickup 31 to generate an RF signal, a wobble signal, and a traverse signal by differential push pull (DPP) detection. The RF signal processor 32 supplies the RF signal and a traverse signal by DPP detection to an analog-to-digital (A/D) servo controller 33, supplies the RF signal to the decoder 36, and supplies the wobble signal to an absolute time in pregroove (ATIP) decoder 38.

The A/D servo controller 33 supplies a servo error signal to a triaxial driver 34 based on the RF signal, the traverse signal by DPP detection, and a frequency generator (FG) signal supplied from a spindle motor 40 to control the triaxial driver 34. The triaxial driver 34 drives the optical pickup 31 under the control of the A/D servo controller 33 such that the optical axis of the optical pickup 31 is at a predetermined position with respect to the track of the optical disc 2.

For example, the A/D servo controller 33 performs servo control based on a focus signal and a tracking signal such that the main beam from the optical pickup 31 traces. a pregroove on the optical disc 2.

An automatic power control (APC) 35 controls the output of the light beam from the optical pickup 31. For example, the APC 35 receives other beams, among the beam incident on the optical disc 2 and the other beams, which are output from a laser diode of the optical pickup 31, by using a photo receiver and controls a driving current of the laser diode such that the light beam is constantly output from the laser diode.

The decoder 36 demodulates the RF signal supplied from the RF signal processor 32 and supplies data (information) obtained by the demodulation to a host interface 37. For example, when the optical disc 2 is a CD, the decoder 36 demodulates the RF signal by eight to fourteen modulation (EFM), performs error correction or the like, and supplies the demodulated and corrected data to the host interface 37. When the optical disc 2 is a DVD, the decoder 36 demodulates the RF signal by eight to sixteen modulation, performs the error correction or the like, and supplies the demodulated and corrected data to the host interface 37.

The ATIP decoder 38 demodulates the wobble signal supplied from the RF signal processor 32 and supplies time code information obtained by the demodulation to host interface 37. The ATIP decoder 38 generates a constant linear velocity (CLV) control signal for controlling the rotational speed of the optical disc 2 and supplies the generated CLV control signal to a spindle driver 39.

The spindle driver 39 drives the spindle motor 40 based on the CLV control signal supplied from the ATIP decoder 38. The spindle motor 40 rotates a spindle on which the optical disc 2 is mounted. For example, the spindle driver 39 drives the spindle motor 40 based on the CLV control signal indicating the linear velocity of the optical disc 2 such that the linear velocity of the optical disc 2 is constant.

The spindle motor 40 supplies the FG signal, which is generated by a built-in frequency generator and which indicates the rotational speed, to the A/D servo controller 33.

The host interface 37 controls the supply of the data from the decoder 36 to the personal computer 51, which is a host, through a host interface bus based on the time code information supplied from the ATIP decoder 38. The host interface 37 also controls the supply of the data supplied from the personal computer 51 through the host interface bus to an encoder 41.

The encoder 41 modulates the data supplied from the personal computer 51 through the host interface 37 and the host interface bus into data appropriate for recording on the optical disc 2 and supplies the modulated data to a write strategy circuit 42. For example, when the optical disc 2 is a CD-R, the encoder 41 modulates the data from the personal computer 51 by the EFM, adds an error correcting code, and supplies the data to the write strategy circuit 42. When the optical disc 2 is a DVD-R, the encoder 41 modulates the data from the personal computer 51 by the eight to sixteen modulation, adds an error correcting code, and supplies the data to the write strategy circuit 42.

The write strategy circuit 42 converts the data from the encoder 41 into data appropriate for writing in the optical disc 2 and supplies the converted data to the optical pickup 31. For example, the write strategy circuit 42 forms pits corresponding to the data from the encoder 41 on the optical disc 2 based on the data from the encoder 41. The write strategy circuit 42 generates data for controlling the output of a laser beam in the writing in the optical pickup 31 and supplies the generated data for controlling the output of the laser beam to the optical pickup 31.

The optical pickup 31 irradiates the optical disc 2 with a light beam having a variable intensity based on the data from the write strategy circuit 42 to form the pits on the optical disc 2.

The system controller 43 controls each component in the optical-disc recording-and-playback apparatus 1.

A drive 52 is connected to the personal computer 51 as required. A magnetic disc 53, an optical disc 54, a magneto-optical disc 55, or a semiconductor memory 56 is mounted on the drive 52. The drive 52 reads out a program recorded in the mounted magnetic disc 53, optical disc 54, magneto-optical disc 55, or semiconductor memory 56 and supplies the program to the personal computer 51. The personal computer 51 supplies the readout program to the system controller 43 through the host interface bus and the host interface 37. The system controller 43 executes the supplied program as required or supplies the program to the A/D servo controller 33 to execute the program.

As described above, the A/D servo controller 33 executes the program recorded in the magnetic disc 53, the optical disc 54, the magneto-optical disc 55, or the semiconductor memory 56.

Figure 2:
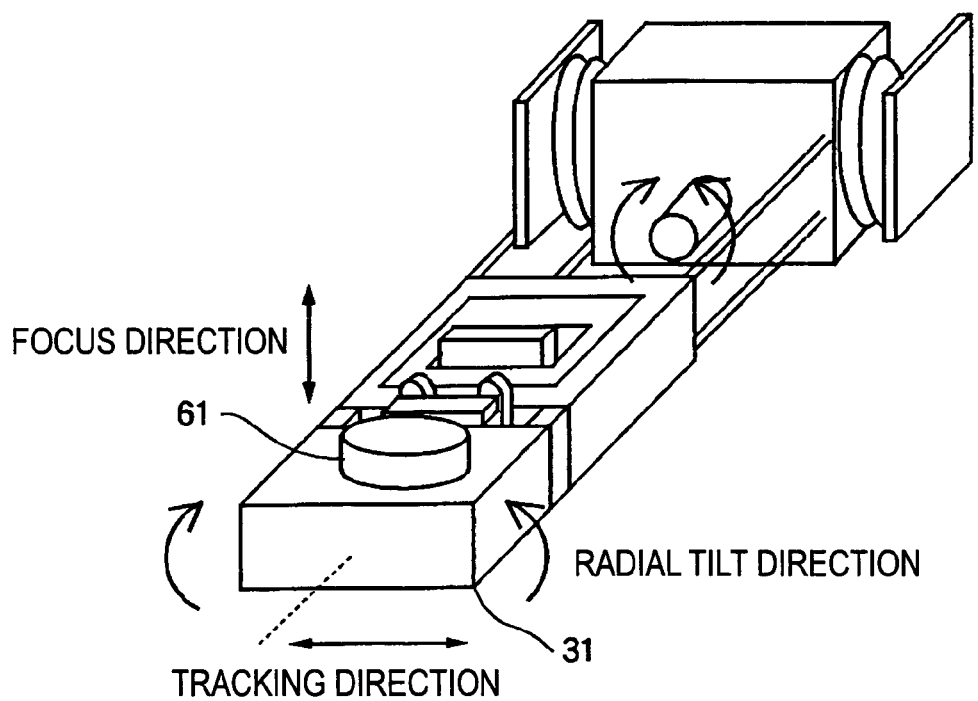
FIG. 2 illustrates the structure of an optical pickup.

FIG. 2 illustrates the structure of the optical pickup 31. An objective lens 61 provided in the optical pickup 31 focuses the light beam with which the optical disc 2 is irradiated on a signal face of the optical disc 2 and focuses the light beam reflected from the optical disc 2 on detectors.

The optical pickup 31 is structured so as to drive the objective lens 61 in three directions. For example, the optical pickup 31 has axes for use in moving the objective lens 61 in a tracking direction or a focus direction. The objective lens 61 further has a mechanism (tilt adjustment mechanism) for tilting the objective lens 61, the axis for use in movement in the tracking direction, and the axis for use in movement in the focus direction in a radial tilt direction (radial skew direction).

When the objective lens 61 is moved in the tracking direction in FIG. 2, the light beam with which the objective lens 61 irradiates the optical disc 2 moves so as to traverse the track on the optical disc 2. When the objective lens 61 is moved in the focus direction in FIG. 2, a distance between the objective lens 61 and the optical disc 2 is varied. When the objective lens 61 is tilted in the radial tilt direction in FIG. 2, the angle of the objective lens 61 with respect to the surface of the optical disc 2 is varied.

Figure 3A:
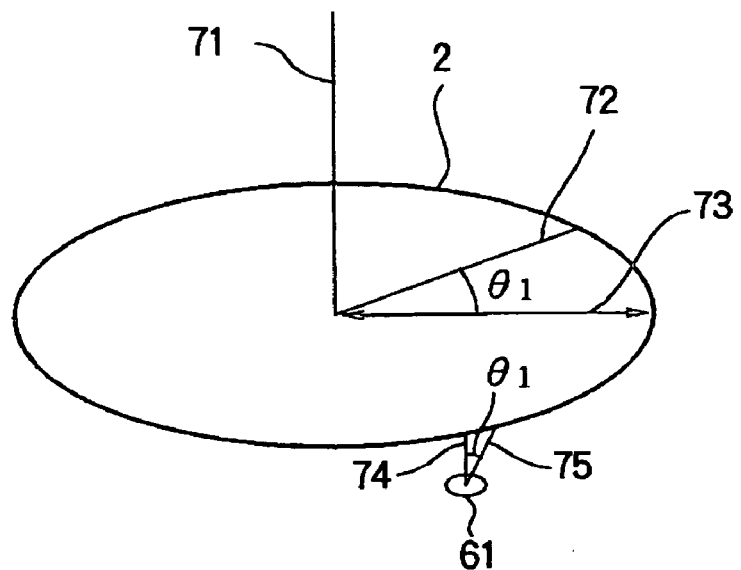
FIGS. 3A and 3B illustrate a radial tilt angle.
Figure 3B:
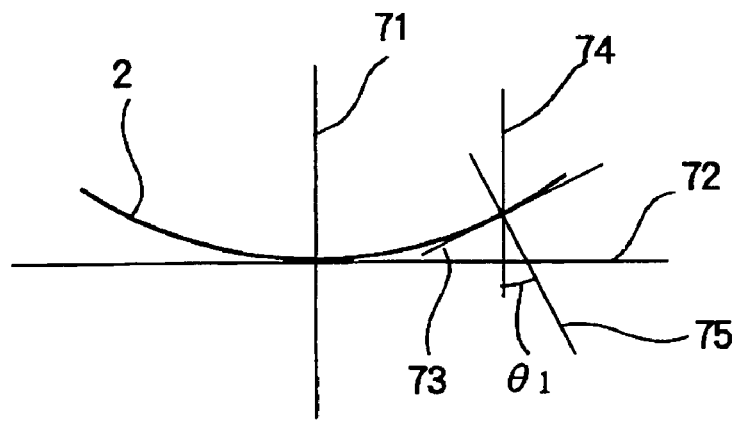

FIGS. 3A and 3B illustrate a radial tilt angle. An axis 72 in FIGS. 3A and 3B is perpendicular to a spindle axis 71. Ideally, the surface of the optical disc 2 is on the axis 72, the angle between the surface of the optical disc 2 and the axis 72 becomes zero, and the spindle axis 71 is perpendicular to the surface of the optical disc 2 when the optical disc 2 is mounted on the spindle.

If the optical disc 2 has radial skew, the angle between the surface of the optical disc 2 and the axis 72 is an angle $\theta_1$ other than zero. In other words, the angle between an axis 73 being in contact with the surface of the optical disc 2 and the axis 72 is $\theta_1$. In order to make the light beam with which the objective lens 61 irradiates the optical disc 2 perpendicular to the surface of the optical disc 2, an optical axis 75 of the objective lens 61 must be perpendicular to the axis 73 being in contact with the surface of the optical disc 2. An axis 74 that passes through a position where the optical disc 2 is irradiated with the light beam and that is parallel to the spindle axis 71 intersects with the optical axis 75 of the objective lens 61 at the angle $\theta_1$.

$\theta_1$ is referred to as a radial tilt. A specific value of the radial tilt is referred to as the radial tilt angle.

The optical-disc recording-and-playback apparatus 1 tilts the objective lens 61 in the radial tilt direction such that the surface of the optical disc 2 is perpendicular to the optical axis 75 of the objective lens 61. The tilt reduces an aberration occurring in the light beam. As a result, a signal-to-noise (S/N) ratio of the RF signal is improved and jitters in the RF signal can be inhibited from occurring.

Figure 4A:
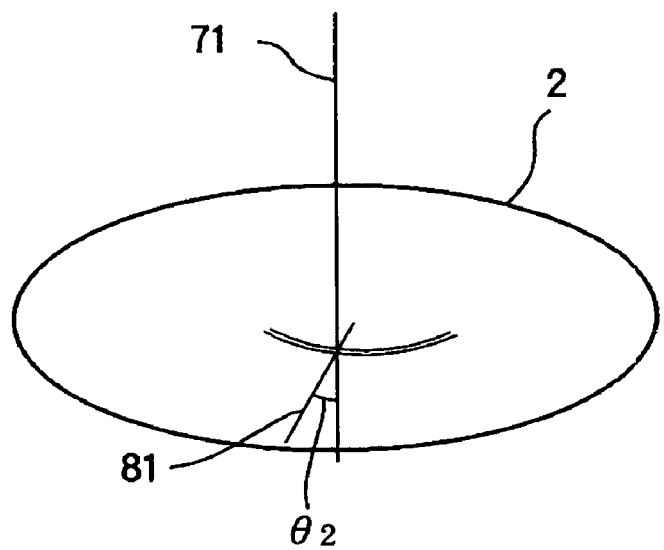
FIGS. 4A and 4B illustrate a tangential tilt angle.
Figure 4B:
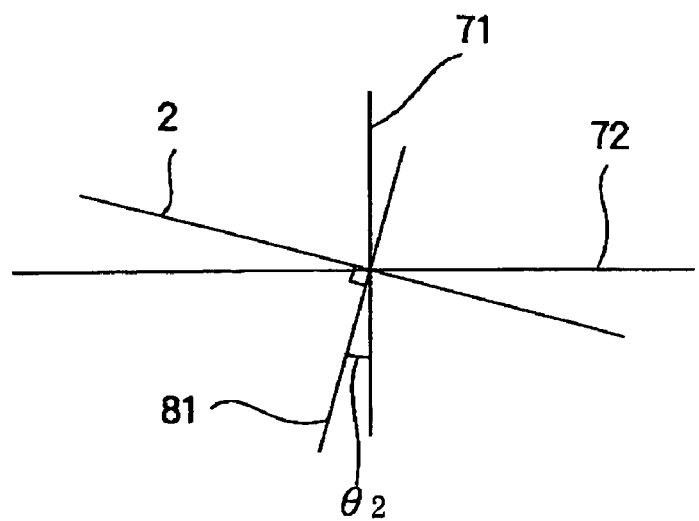

FIGS. 4A and 4B illustrate a case where the optical disc 2 is mounted on the spindle at a tilt. In this case, the angle between the spindle axis 71 and an axis 81 perpendicularly intersecting with the surface of the optical disc 2 is referred to as a tangential tilt angle.

Figure 5:
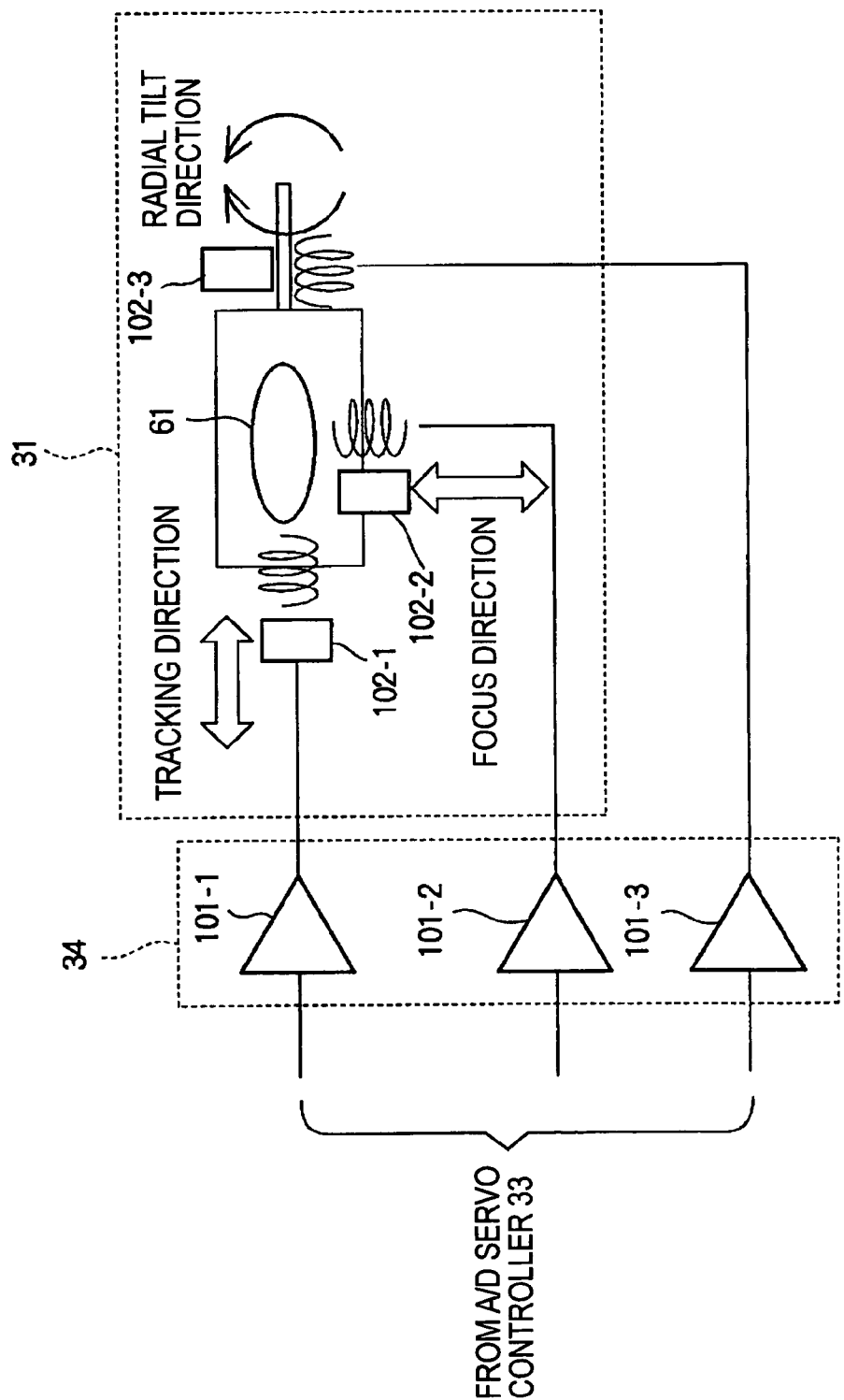
FIG. 5 illustrates the structure of a triaxial driver.

FIG. 5 illustrates the structure of the triaxial driver 34. The triaxial driver 34 includes amplifiers 101-1 to 101-3. The amplifier 101-1 drives a driver 102-1 in the optical pickup 31 based on a servo error signal in the tracking direction among the servo error signals from the A/D servo controller 33. The driver 102-1 including a magnet and springs moves the objective lens 61 to a position in the tracking direction, corresponding to a current (voltage) supplied from the amplifier 101-1.

The amplifier 101-2 drives a driver 102-2 in the optical pickup 31 based on a servo error signal in the focus direction among the servo error signals from the A/D servo controller 33. The driver 102-2 including a magnet and springs moves the objective lens 61 to a position in the focus direction, corresponding to a current (voltage) supplied from the amplifier 101-2.

The amplifier 101-3 drives a driver 102-3 in the optical pickup 31 based on a servo error signal in the radial tilt direction (hereinafter, also referred to as a tilt-angle control signal) among the servo error signals from the A/D servo controller 33. The driver 102-3 including a magnet and springs tilts the objective lens 61 so as to obtain a radial tilt angle corresponding to a current (voltage) supplied from the amplifier 101-3.

Figure 6:
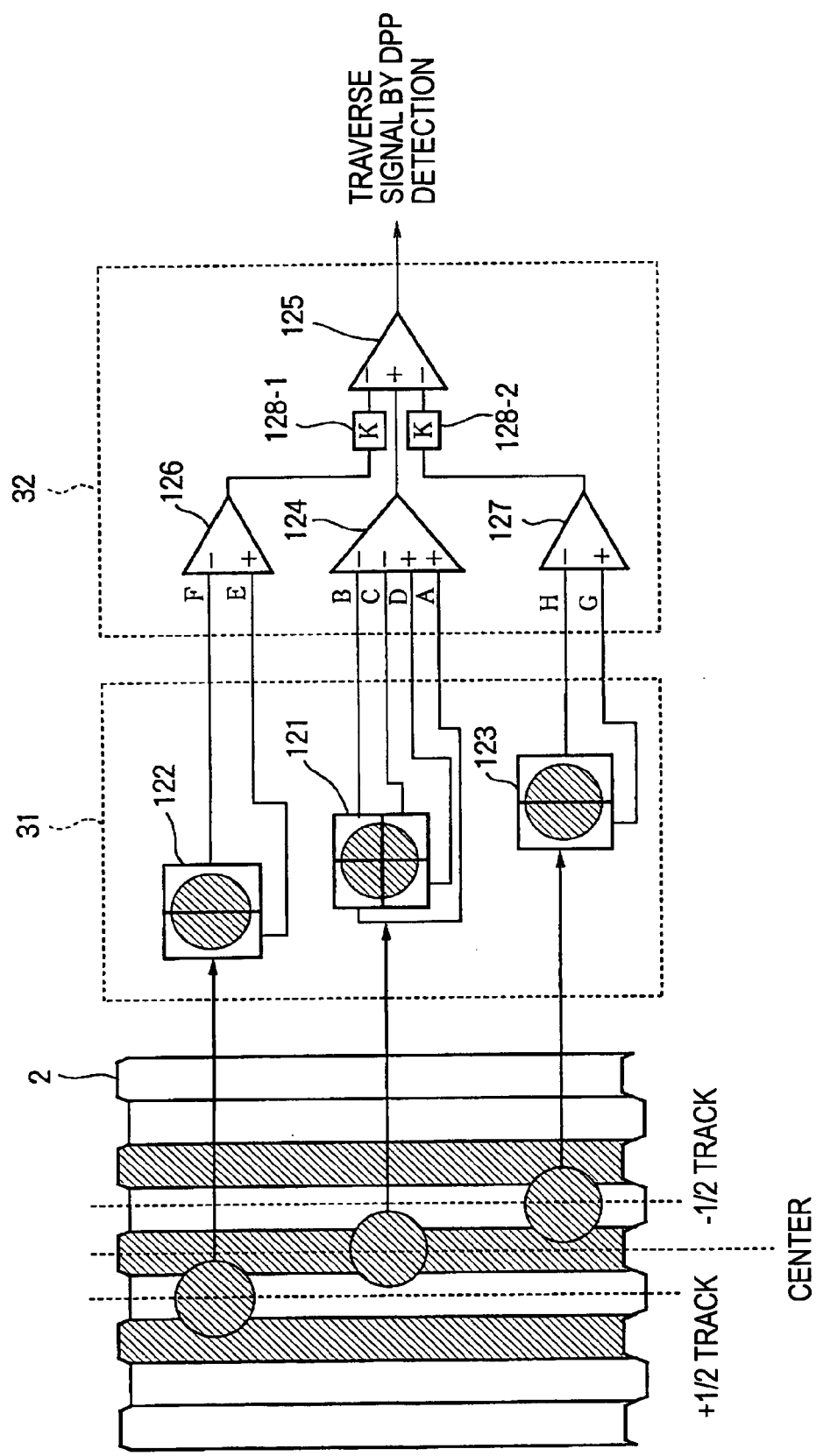
FIG. 6 illustrates generation of a traverse signal by DPP detection.

FIG. 6 illustrates generation of a traverse signal by DPP detection. As shown at the left side of FIG. 6, during tracking, the main beam is incident on the optical disc 2 such that the center of the main beam is positioned at the center of the tracked track. The preceding beam is incident on a position, on the optical disc 2, which is ahead of the main beam and is shifted from the main beam by +½ track (a position on the optical disc 2 to be scanned by the main beam). The succeeding beam is incident on a position, on the optical disc 2, which is behind the main beam and is shifted from the main beam by −½ track (a position on the optical disc 2 scanned by the main beam).

The optical pickup 31 detects the main beam reflected from the optical disc 2, the preceding beam reflected from the optical disc 2, and the succeeding beam reflected from the optical disc 2.

In other words, a detector 121 in the optical pickup 31 converts the main beam reflected from the optical disc 2 into signals. For example, the detector 121, which is a photo diode, converts the main beam reflected from the optical disc 2 into a current and outputs the current having an intensity corresponding to the beam intensity. The current output from the detector 121 is converted into a voltage that is supplied to the RF signal processor 32.

A light-receiving area of the detector 121 is divided into four parts. Each of the divided parts of the light-receiving area of the detector 121 is similar to the entire light-receiving area of the detector 121 and has a quarter area of the entire light-receiving area of the detector 121. Two divided parts of the light-receiving area of the detector 121 are provided ahead with respect to the scanning direction of the optical disc 2 by the main beam, and two divided parts of the light-receiving area of the detector 121 are provided behind with respect thereto.

The main beam detected in a front-left-side part of the light-receiving area of the detector 121 with respect to the scanning direction of the optical disc 2 by the main beam is converted into a signal A that is supplied to the RF signal processor 32. The main beam detected in a front-right-side part of the light-receiving area of the detector 121 with respect to the scanning direction of the optical disc 2 by the main beam is converted into a signal B that is supplied to the RF signal processor 32.

The main beam detected in a back-right-side part of the light-receiving area of the detector 121 with respect to the scanning direction of the optical disc 2 by the main beam is converted into a signal C that is supplied to the RF signal processor 32. The main beam detected in a back-left-side part of the light-receiving area of the detector 121 with respect to the scanning direction of the optical disc 2 by the main beam is converted into a signal D that is supplied to the RF signal processor 32.

A detector 122 in the optical pickup 31 converts the preceding beam reflected from the optical disc 2 into signals. For example, the detector 122, which is a photo diode, converts the preceding beam reflected from the optical disc 2 into a current and outputs the current having an intensity corresponding to the beam intensity. The current output from the detector 122 is converted into a voltage that is supplied to the RF signal processor 32.

A light-receiving area of the detector 122 is divided into two parts. For example, the light-receiving area of the detector 122 is divided into right and left parts with respect to the scanning direction of the optical disc 2 by the preceding beam. Each of the divided parts of the light-receiving area of the detector 122 has a half area of the entire light-receiving area of the detector 122.

The preceding beam detected in a left-side part of the light-receiving area of the detector 122 with respect to the scanning direction of the optical disc 2 by the preceding beam is converted into a signal E that is supplied to the RF signal processor 32. The preceding beam detected in a right-side part of the light-receiving area of the detector 122 with respect to the scanning direction of the optical disc 2 by the preceding beam is converted into a signal F that is supplied to the RF signal processor 32.

A detector 123 in the optical pickup 31 converts the succeeding beam reflected from the optical disc 2 into signals. For example, the detector 123, which is a photo diode, converts the succeeding beam reflected from the optical disc 2 into a current and outputs the current having an intensity corresponding to the beam intensity. The current output from the detector 123 is converted into a voltage that is supplied to the RF signal processor 32.

A light-receiving area of the detector 123 is divided into two parts. For example, the light-receiving area of the detector 123 is divided into right and left parts with respect to the scanning direction of the optical disc 2 by the succeeding beam. Each of the divided parts of the light-receiving area of the detector 123 has a half area of the entire light-receiving area of the detector 123.

The succeeding beam detected in a left-side part of the light-receiving area of the detector 123 with respect to the scanning direction of the optical disc 2 by the succeeding beam is converted into a signal G that is supplied to the RF signal processor 32. The succeeding beam detected in a right-side part of the light-receiving area of the detector 123 with respect to the scanning direction of the optical disc 2 by the succeeding beam is converted into a signal H that is supplied to the RF signal processor 32.

The RF signal processor 32 processes the signals supplied from the optical pickup 31 to generate various signals. For example, the RF signal processor 32 generates the traverse signal by DPP detection based on the signals A to H supplied from the optical pickup 31.

The RF signal processor 32 includes differential amplifiers 124 to 127 and amplifiers 128-1 to 128-2. The differential amplifier 124 adds the signal A to the signal D, supplied from the optical pickup 31, subtracts the signals B and C from the sum of the signals A and D, and supplies the subtraction result to the differential amplifier 125. The signal output from the differential amplifier 124, which indicates the result given by adding the signal A to the signal D and subtracting the signals B and C from the sum of the signals A and D, is also referred to as a traverse signal by push-pull detection of the main beam.

The differential amplifier 126 subtracts the signal F from the signal E, which are supplied from the optical pickup 31, and supplies the subtraction result to the amplifier 128-1. The signal output from the differential amplifier 126, which indicates the result given by subtracting the signal F from the signal E, is also referred to as a traverse signal by push-pull detection of the preceding beam.

The differential amplifier 127 subtracts the signal H from the signal G, which are supplied from the optical pickup 31, and supplies the subtraction result to the amplifier 128-2. The signal output from the differential amplifier 127, which indicates the result given by subtracting the signal H from the signal G, is also referred to as a traverse signal by push-pull detection of the succeeding beam.

The amplifier 128-1 amplifies the signal supplied from the differential amplifier 126 with a predetermined gain K and supplies the amplified signal to the differential amplifier 125. The amplifier 128-2 amplifies the signal supplied from the differential amplifier 127 with the predetermined gain K, as in the amplifier 128-1, and supplies the amplified signal to the differential amplifier 125.

The differential amplifier 125 subtracts the signals supplied from the amplifiers 128-1 and 128-2 from the signal supplied from the differential amplifier 124 to calculate a traverse signal by DPP detection and outputs the traverse signal by DPP detection.

Specifically, the traverse signal by DPP detection is given by subtracting the traverse signal by push-pull detection of the preceding beam and the traverse signal by push-pull detection of the succeeding beam, which are multiplied by the predetermined gain K, from the traverse signal by push-pull detection of the main beam.

That is, the value of the traverse signal by DPP detection is calculated according to equation (1):

[Formula 1]

$$\text{Value of traverse signal by DPP detection} = (A+D) - (B+C) - K((E+G) - (F+H)) \quad (1)$$

where reference numerals A to H denote the values of the signals A to H. The gain K is determined so as to cancel an offset caused by a lens shift.

The relationship of the radial tilt angle between a light beam from the objective lens 61 in the optical pickup 31 and the optical disc 2 with respect to a traverse signal by DPP detection will now be described.

Figure 7:
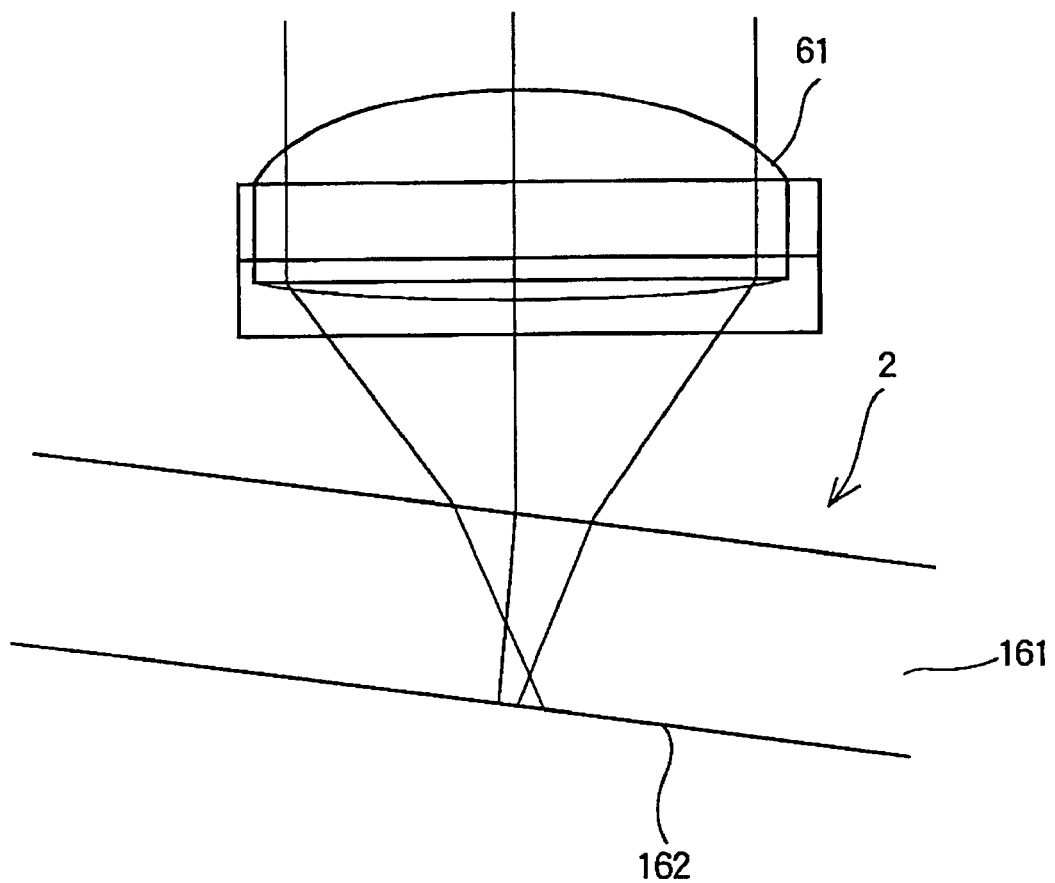
FIG. 7 illustrates an aberration of a light beam.

FIG. 7 illustrates an aberration of a light beam when the surface of the optical disc 2 is irradiated with the light beam from the objective lens 61 at an angle other than perpendicular.

A substrate 161 of the optical disc 2 is made of, for example, polycarbonate and the refractive index of the substrate 161 with respect to air is one or more. When the surface of the optical disc 2 is irradiated with the light beam from the objective lens 61 at an angle other than perpendicular, a signal face 162 of the optical disc 2 is irradiated with the light beam having an aberration due to the refractive index of the substrate 161 of the optical disc 2 with respect to air.

As a result, the light beam reflected from the optical disc 2 by the effect of the aberration is detected by the detectors 121 to 123 in the optical pickup 31.

FIG. 8 illustrates an example of the light beam that is detected by the detectors 121 to 123 in the optical pickup 31 and is reflected from the optical disc 2 by the effect of the aberration.

Referring to FIG. 8, circles drawn by solid lines represent light beams (spots) that are detected by the detectors 121 to 123 in the optical pickup 31 and are reflected from the optical disc 2 when the light beams are incident on the optical disc 2 at right angles. When no aberration occurs (or a small aberration occurs), the center of the light beams reflected from the optical disc 2 substantially coincides with the centers of the detectors 121 to 123 in the optical pickup 31.

In contrast, circles drawn by broken lines represent light beams (spots) that are detected by the detectors 121 to 123 in the optical pickup 31 and are reflected from the optical disc 2 when the light beams are incident on the optical disc 2 at an angle other than perpendicular. When an aberration occurs, the center of the light beams reflected from the optical disc 2 is shifted from the centers of the detectors 121 to 123 in the optical pickup 31.

The shifts of the centers of the light beams reflected from the optical disc 2 from the centers of the detectors 121 to 123 are increased as the aberration increases. In other words, the shifts of the centers of the light beams reflected from the optical disc 2 from the centers of the detectors 121 to 123 are increased as the angle between the optical axis 75 of the objective lens 61 and the axis 73 being in contact with the surface of the optical disc 2 is shifted from perpendicular.

Figure 9:
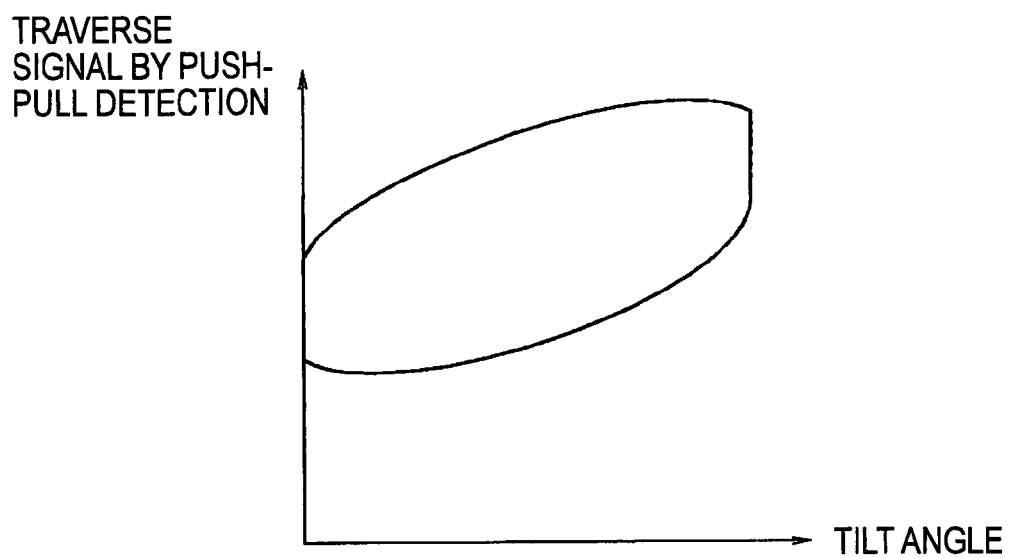
FIG. 9 illustrates a traverse signal by push-pull detection with respect to the radial tilt angle.

As described above, since the center of the light beam reflected from the optical disc 2 shifts from the center of the detector 121, an offset with respect to the radial tilt angle, represented by a primary expression, occurs in the traverse signal by push-pull detection of the main beam, as shown in FIG. 9. For example, the traverse signal by push-pull detection varies in amplitude with respect to the radial tilt angle around an upward-sloping straight line.

The tilt of the optical axis 75 with respect to the surface of the optical disc 2 when the traverse signal by push-pull detection has a maximum amplitude substantially coincides with the tilt of the optical axis 75 with respect to the surface of the optical disc 2 with a minimum aberration.

However, when the tilt of the optical axis 75 with respect to the surface of the optical disc 2 with a minimum aberration is to be determined from the traverse signal by push-pull detection, the offset is varied with respect to the radial tilt angle. Accordingly, the tilt of the optical axis 75 with respect to the surface of the optical disc 2 with a minimum aberration cannot be determined by using only the maximum amplitude of the traverse signal by push-pull detection and, therefore, it is necessary to determine the amplitude of the traverse signal by push-pull detection for comparison.

Figure 10:
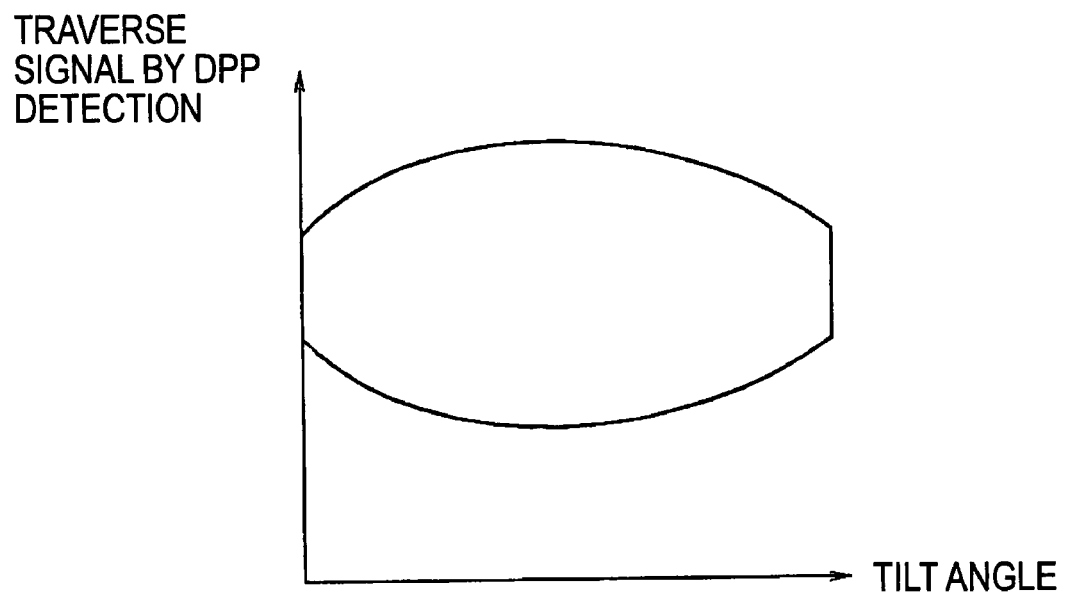
FIG. 10 illustrates the traverse signal by DPP detection with respect to the radial tilt angle.

In contrast, since the gain K (equation (1)) of the traverse signal by DPP detection is set so as to cancel the offset, the offset of the traverse signal by DPP detection is constant and does not change with respect to the radial tilt angle, as shown in FIG. 10.

The tilt of the optical axis 75 with respect to the surface of the optical disc 2 when the traverse signal by DPP detection has a maximum amplitude substantially coincides with the tilt of the optical axis 75 with respect to the surface of the optical disc 2 with a minimum aberration.

When the tilt of the optical axis 75 with respect to the surface of the optical disc 2 with a minimum aberration is to be determined from the traverse signal by DPP detection, the offset of the traverse signal by DPP detection is not varied with respect to the radial tilt angle. Accordingly, the values of points of the traverse signal by DPP detection are compared with each other, and the tilt of the optical axis 75 with respect to the surface of the optical disc 2 with a minimum aberration is determined from a maximum value among the above values.

As described above, the optical-disc recording-and-playback apparatus 1 of the present invention tilts the optical pickup 31 in the radial tilt direction and detects signals including a traverse signal by DPP detection for every radial tilt angle. The optical-disc recording-and-playback apparatus 1 determines the radial tilt angle of a signal having a maximum amplitude and controls the orientation of the optical pickup 31 so as to obtain the determined radial tilt angle to minimize the aberration of the light beam.

Figure 11:
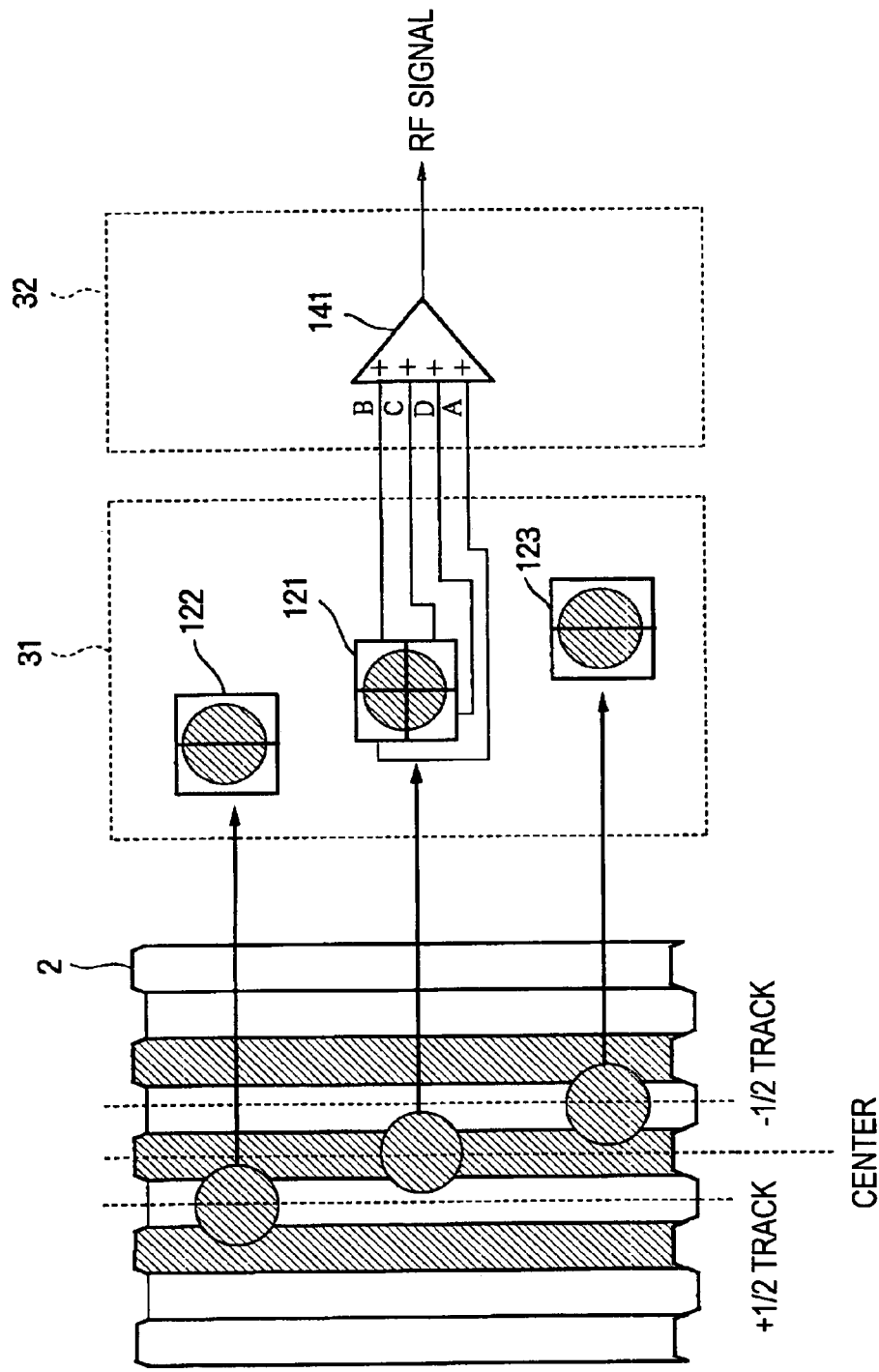
FIG. 11 illustrates generation of an RF signal.

The RF signal processor 32 generates RF signals. FIG. 11 illustrates generation of an RF signal. The same reference numerals are used in FIG. 11 to identify the same components shown in FIG. 6. A description of such components is omitted here.

The RF signal processor 32 further includes a differential amplifier 141.

The differential amplifier 141 does the addition of signals A, B, C, and D supplied from the optical pickup 31 to calculate an RF signal and outputs the RF signal.

That is, the value of the RF signal is calculated according to equation (2):

[Formula 2]

$$\text{Value of RF signal} = A+B+C+D \quad (2)$$

where reference numerals A to D denote the values of the signals A to D.

According to the present invention, the traverse signal by DPP detection is used in a storage medium, which is the optical disc 2, such as a DVD-R, DVD-RW, DVD+R, or DVD+RW, without using the RF signal supplied only after the data is recorded, in order to achieve the same effect before and after the data is recorded in the storage medium. In contrast, since it is difficult to detect the traverse signal by push-pull detection in a recording medium, which is the optical disc 2, such as a DVD-ROM, due to the relationship between the wavelength of the light beam and the pit depth, the RF signal is used, without using the traverse signal by DPP detection.

Hence, a type of the optical disc 2 is detected and either the RF signal or the traverse signal by DPP detection is selected based on the detected type.

Specifically, when the optical disc 2 in which it is difficult to detect the traverse signal by push-pull detection is mounted, the optical-disc recording-and-playback apparatus 1 of the present invention tilts the optical pickup 31 in the radial tilt direction and detects a signal, such as an RF signal, for every radial tilt angle. The optical-disc recording-and-playback apparatus 1 determines the radial tilt angle of a signal having a maximum amplitude and controls the orientation of the optical pickup 31 so as to obtain the determined radial tilt angle to minimize the aberration of the light beam.

In this manner, it is possible to correct the tilt of the optical axis in the radial tilt direction with respect to the optical disc 2 even when it is difficult to detect the traverse signal by push-pull detection in the optical disc 2.

Figure 12:
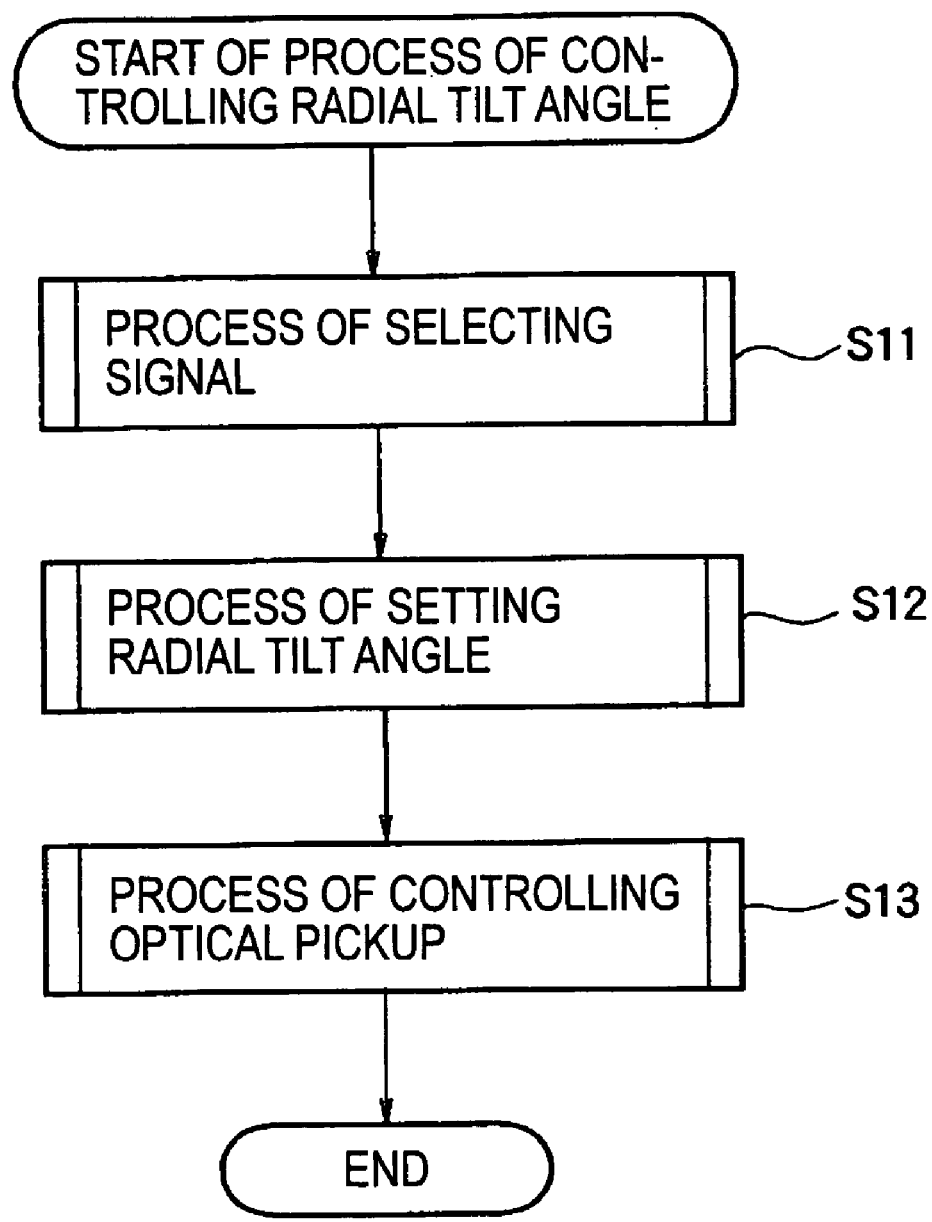
FIG. 12 is a flowchart showing a process of controlling the radial tilt angle.

FIG. 12 is a flowchart showing a process of controlling the radial tilt angle performed by the A/D servo controller 33 executing the control program.

In Step S11, the control program performs a process of selecting a signal. The process of selecting a signal will be described in detail below with reference to a flowchart in FIG. 13.

In Step S12, the control program performs a process of setting the radial tilt angle. The process of setting the radial tilt angle will be described in detail below with reference to FIGS. 14 to 16. The radial tilt angle in Step 12 is an angle of the optical axis 75 of the objective lens 61 with respect to the axis 74 that is parallel to the spindle axis 71.

In Step S13, the control program performs a process of controlling the optical pickup 31 to control the orientation of the optical pickup 31 with respect to the optical disc 2 and completes the process. The process of controlling the optical pickup 31 will be described in detail below with reference to a flowchart in FIG. 20.

Figure 13:
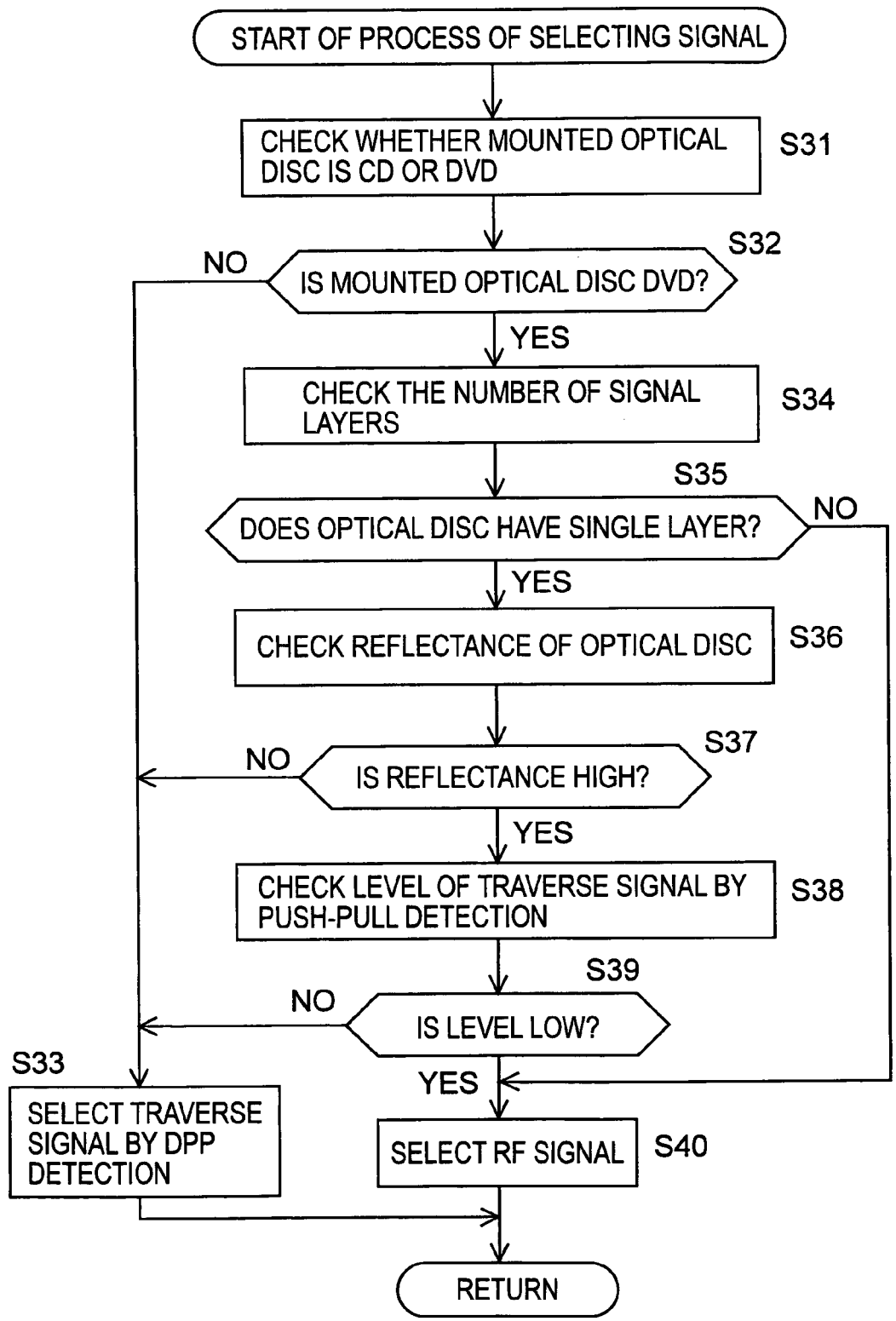
FIG. 13 is a flowchart showing in detail a process of selecting a signal.

FIG. 13 is a flowchart showing in detail the process of selecting a signal in Step S11 in FIG. 12. In Step S31, the control program checks whether the mounted optical disc 2 is a CD or a DVD based on the signal supplied from the RF signal processor 32. For example, in Step S31, the control program checks whether the mounted optical disc 2 is a CD or a DVD based on an S-shaped focus signal obtained by moving the objective lens 61 in a direction in which the objective lens 61 is set apart from the optical disc 2.

In Step S32, the control program determines whether the mounted optical disc 2 is a DVD. If the control program determines that the mounted optical disc 2 is not a DVD, that is, is a CD, the control program proceeds to Step S33 to select a traverse signal by DPP detection and completes the process.

If the control program determines in Step S32 that the mounted optical disc 2 is a DVD, the control program proceeds to Step S34 to check the number of signal layers (signal faces) on the optical disc 2, which is the mounted DVD. For example, in Step S34, the control program checks the number of signal layers on the optical disc 2, which is the mounted DVD, based on whether two S-shaped waveforms can be detected in an S-shaped focus signal obtained by moving the objective lens 61 in a direction in which the objective lens 61 is close to the optical disc 2.

In Step S35, the control program determines whether the optical disc 2, which is the mounted DVD, is a single-layer disc (the number of signal layers is one). If the control program determines that the optical disc 2 is a signal-layer disc, the control program proceeds to Step S36 to check the reflectance of the optical disc 2, which is the mounted DVD.

In Step S37, the control program compares the reflectance of the optical disc 2 obtained by the check with a predetermined threshold value to determine whether the reflectance of the optical disc 2, which is the mounted DVD, is high. If the control program determines that the reflectance of the optical disc 2 is high, the control program proceeds to Step S38 because the mounted optical disc 2 is any of a DVD-ROM, a DVD-R, and a DVD+R. In Step S38, the control program checks the level of the traverse signal by push-pull detection of the main beam supplied from the RF signal processor 32.

In Step S39, the control program compares the level of the traverse signal by push-pull detection of the main beam with a predetermined threshold value to determine whether the level of the traverse signal by push-pull detection is low. If the control program determines that the level of the traverse signal by push-pull detection is low, the control program proceeds to Step S40 because the mounted optical disc 2 is a DVD-ROM. In step S40, the control program selects an RF signal and completes the process.

If the control program determines in Step S39 that the level of the traverse signal by push-pull detection is not low, that is, the level of the traverse signal by push-pull detection is high, the control program proceeds to Step S33 because the mounted optical disc 2 is a DVD-R or a DVD+R. In step S33, the control program selects a traverse signal by DPP detection and completes the process.

If the control program determines in Step S37 that the reflectance of the optical disc 2, which is the mounted DVD, is not high, that is, the reflectance of the optical disc 2 is low, the control program proceeds to Step S33 because the mounted optical disc 2 is a DVD-RW or DVD+RW. In Step S33, the control program selects a traverse signal by DPP detection and completes the process.

If the control program determines in Step S35 that the optical disc 2 is not a signal-layer disc, that is, the optical disc 2 is a dual-layer disc (two layers), the control program proceeds to Step S40 because the mounted optical disc 2 is a DVD-ROM. In Step S40, the control program selects an RF signal and completes the process.

As described above, the optical-disc recording-and-playback apparatus 1 can select a signal for use in controlling the radial tilt angle depending on a type of the mounted optical disc 2. Specifically, when the optical disc 2 is a DVD-R, DVD-RW, DVD+R, DVD+RW, or the like, the optical-disc recording-and-playback apparatus 1 selects a traverse signal by DPP detection capable of achieving the same effect before and after the data is recorded. When the optical disc 2 is a DVD-ROM or the like in which it is difficult to detect the traverse signal by push-pull detection, the optical-disc recording-and-playback apparatus 1 selects an RF signal.

Figure 14:
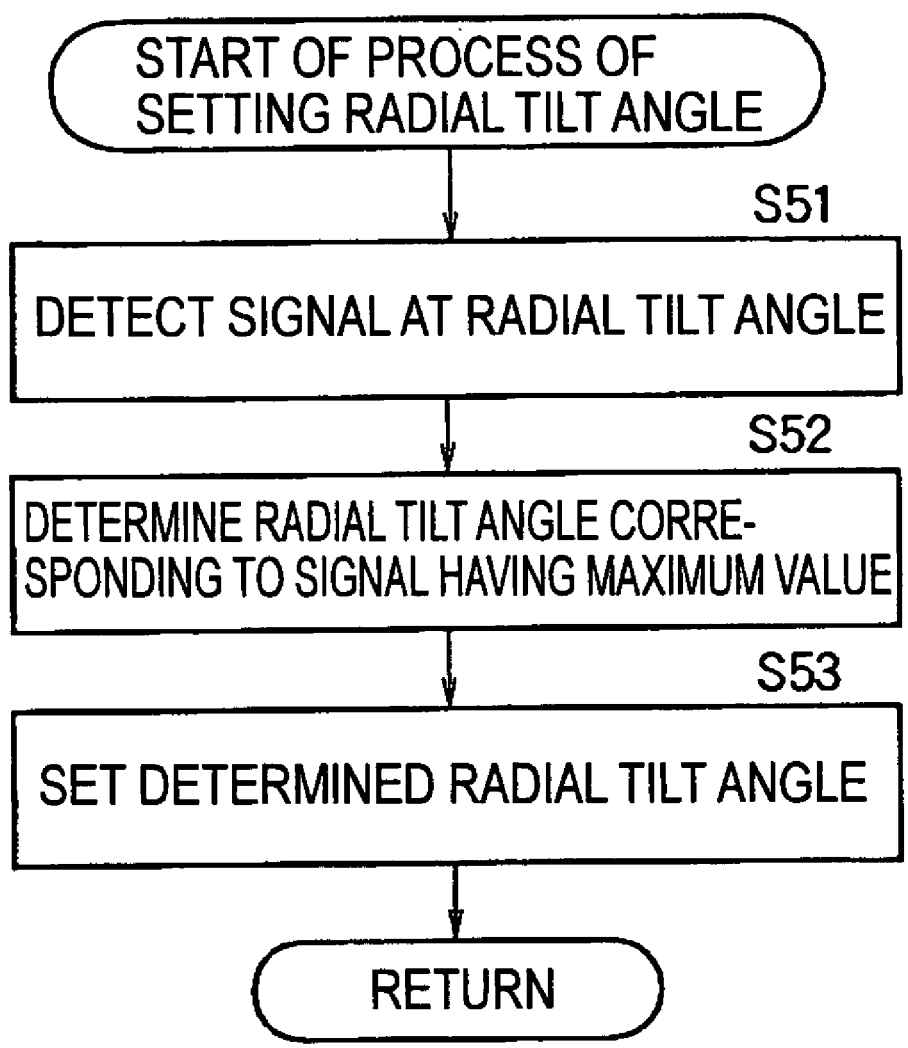
FIG. 14 is a flowchart schematically showing a process of setting the radial tilt angle.

FIG. 14 is a flowchart schematically showing the process of setting the radial tilt angle in Step S12 in FIG. 12. In Step S51, the control program detects the signal selected in S11 at a predetermined radial tilt angle of the optical pickup 31.

For example, in Step S51, the control program controls the orientation of the optical pickup 31 such that the optical axis 75 of the objective lens 61 in the optical pickup 31 has a predetermined radial tilt angle with respect to the optical disc 2, and detects the signal selected in Step S11 at the predetermined radial tilt angle. In Step S51, the control program then controls the orientation of the optical pickup 31 such that the optical axis 75 of the objective lens 61 in the optical pickup 31 has a subsequent radial tilt angle with respect to the optical disc 2, and detects the signal selected in Step S11 at the subsequent radial tilt angle.

As described above, in Step S51, the control program controls the orientation of the optical pickup 31 such that the optical axis 75 of the objective lens 61 in the optical pickup 31 has several predetermined radial tilt angles within a certain range with respect to the optical disc 2, and detects the signal selected in Step S11 for every radial tilt angle.

In Step S52, the control program determines the radial tilt angle corresponding to the signal having a maximum value among signals detected in Step S51. For example, in Step S52, the control program determines the radial tilt angle of the optical axis 75 of the objective lens 61 in the optical pickup 31 with respect to the optical disc 2, corresponding to a traverse signal within a second range including a maximum value among signals detected for every radial tilt angle in a first range in Step S51.

More specifically, when the radial tilt angle is varied stepwise in the first range, an intermediate radial tilt angle can be optimal. Accordingly, in Step S52, the control program determines the radial tilt angle of the optical axis 75 of the objective lens 61 in the optical pickup 31 with respect to the optical disc 2, corresponding to a traverse signal within any range that is 80% to 100% of a maximum value among signals detected for every radial tilt angle within the first range in Step S51. This step permits accurate and reliable correction of the tilt of the optical axis in the radial tilt direction with respect to the optical disc 2.

In Step S53, the control program sets the radial tilt angle determined in Step S52 and completes the process.

The process of setting the radial tilt angle in Step S12 in FIG. 12 will now be described in detail with reference to FIGS. 15 and 16.

Figure 15:
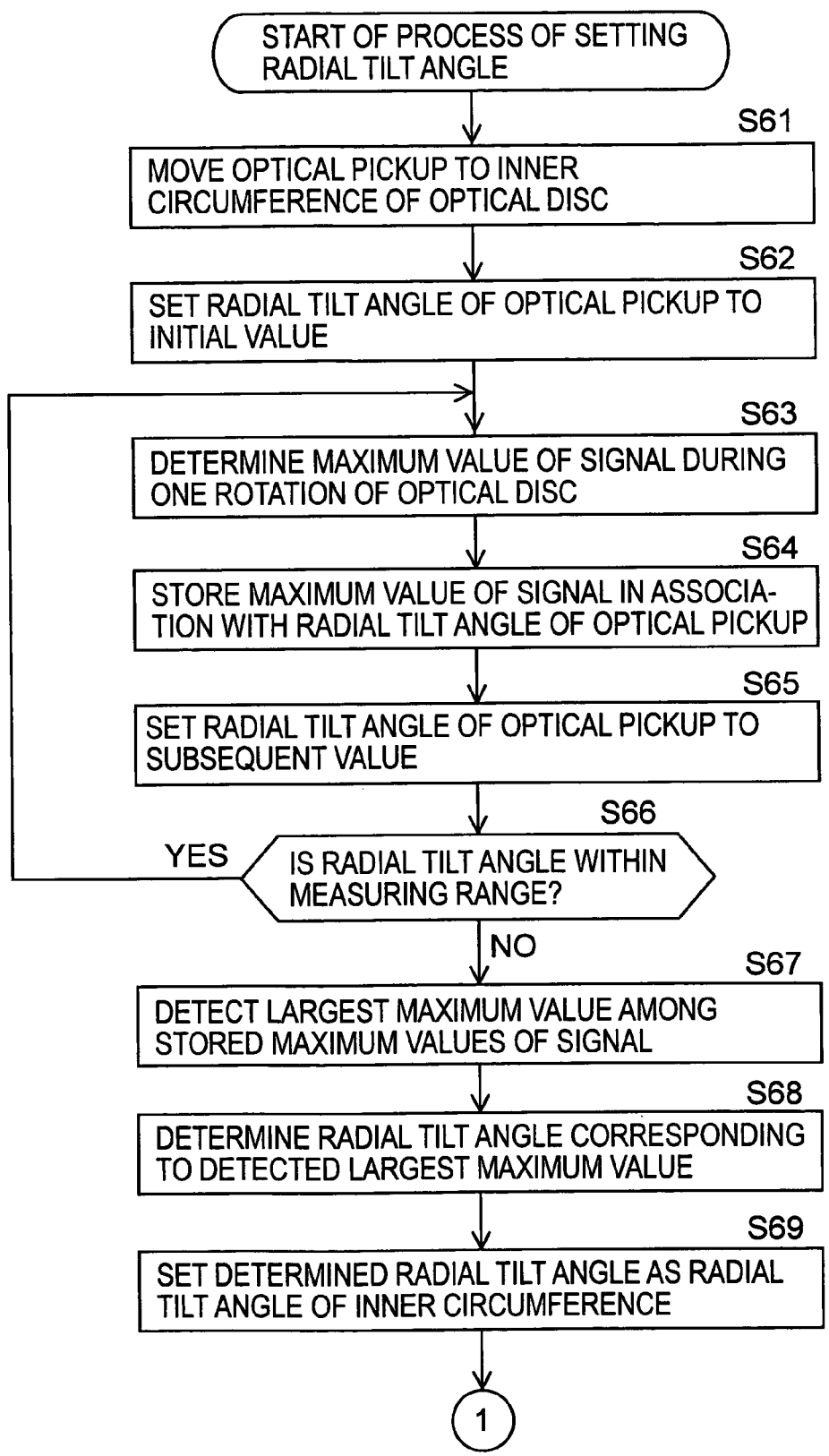
FIG. 15 is a flowchart showing in detail the process of setting the radial tilt angle.

Referring to FIG. 15, in Step S61, the control program controls the triaxial driver 34 to move the optical pickup 31 to the inner circumference of the mounted optical disc 2. The inner circumference of the optical disc 2 means an area that is closer to the lead-in area among data areas on the optical disc 2. For example, a sub-area that is closest to the lead-in area among three sub-areas, having the same amount of data, given by dividing the data area on the optical disc 2 is referred to as the inner circumference. In this case, an area that is closest to the lead-out area is referred to as the outer circumference and an area between the inner circumference and the outer circumference is referred to as the intermediate circumference. Specifically, in Step S61, the control program controls the triaxial driver 34 to move the optical pickup 31 to the inner circumference of the mounted optical disc 2 and to perform focus-servo control for the optical pickup 31. At this time, the control program does not perform tracking-servo control.

In Step S62, the control program controls the triaxial driver 34 to set the radial tilt angle of the optical pickup 31 to an initial value. For example, in Step S62, the control program controls the triaxial driver 34 by supplying the tilt-angle control signal to the triaxial driver 34 to set the radial tilt angle of the optical pickup 31 to an initial value of −0.8°.

In Step S63, the control program determines a maximum value of the signal during one rotation of the optical disc 2. For example, in Step S63, the control program causes an analog-to-digital converter in the A/D servo controller 33 to sample signals at sufficiently short intervals relative to the period of the signal (quantization) and determines a maximum value of the signal among the sampled values during one rotation of the optical disc 2.

The signal here means the signal selected in the process described with reference to the flowchart in FIG. 13. When the optical disc 2 is a CD, a DVD-R, a DVD-RW, a DVD+R, or a DVD+RW, the control program determines a maximum value of the traverse signal by DPP detection during one rotation of the optical disc 2 in Step S63. In contrast, when the optical disc 2 is a DVD-ROM, the control program determines a maximum value of the RF signal during one rotation of the optical disc 2 in Step S63.

Figure 17:
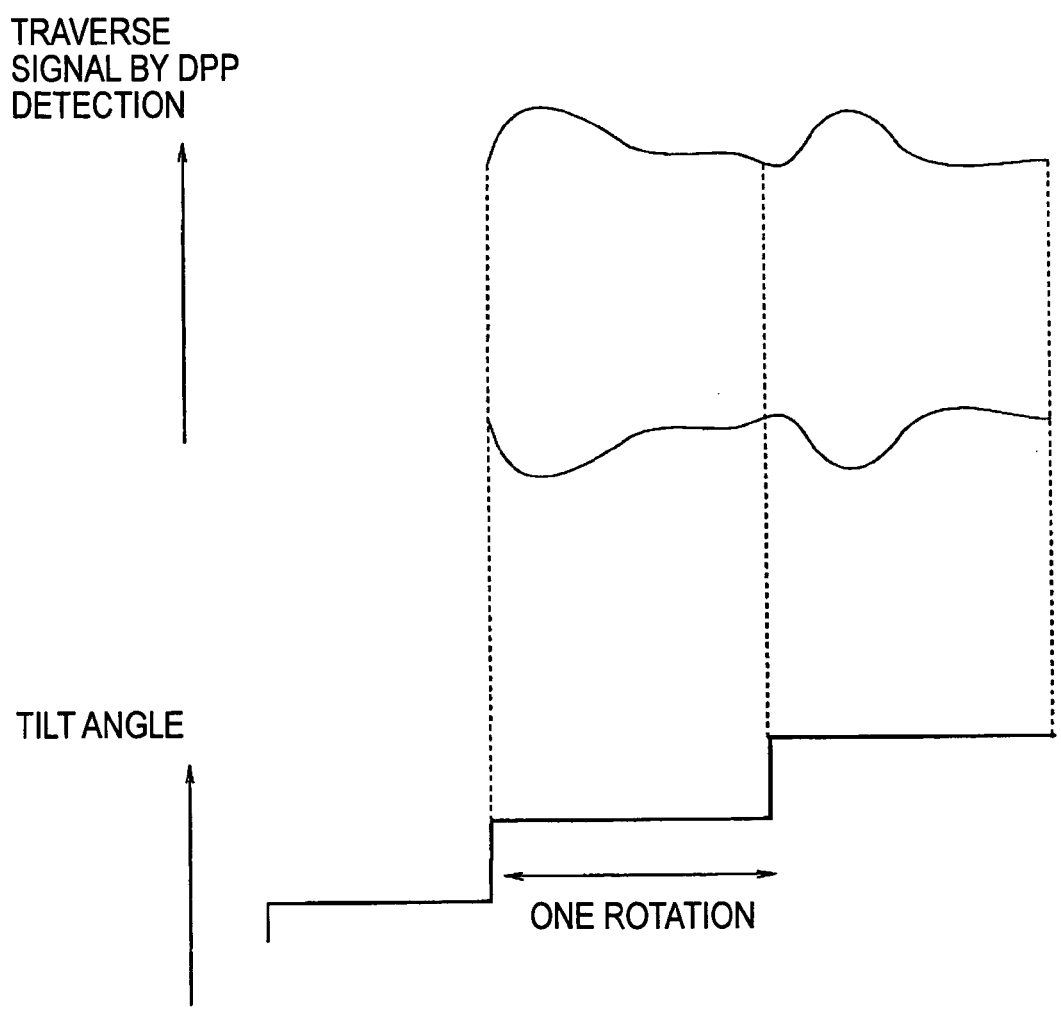
FIG. 17 illustrates a variation in the traverse signal by DPP detection during one rotation of an optical disc.

The control program determines, in Step S63, a maximum value of the signal during one rotation of the optical disc 2 in order to avoid the effect of a change in the signal value (a fluctuation of the signal) depending on the rotation angle of the optical disc 2 during one period, that is, during one rotation of the optical disc 2, caused by, for example, uneven coating of dye in the optical disc 2, as shown in FIG. 17. In other words, for example, the control program compares a maximum value of the signal during one rotation of the optical disc 2 at a certain radial tilt angle with a minimum value of the signal during one rotation of the optical disc 2 at a subsequent radial tilt angle to prevent a wrong radial tilt angle from being determined.

In Step S64, the control program stores the maximum value of the signal in association with the radial tilt angle of the optical pickup 31. For example, in Step S64, the control program stores the maximum value of the signal determined in Step S63 in association with the initial value of the radial tilt angle set in Step S62. In the iteration of Step S64, the control program stores the maximum value of the signal determined in Step S63 in association with the value of the radial tilt angle to be set in Step S65 described below.

In Step S65, the control program controls the triaxial driver 34 to set the radial tilt angle of the optical pickup 31 to a subsequent value. For example, in Step S65, the control program controls the triaxial driver 34 to set the radial tilt angle of the optical pickup 31 to an angle given by adding 0.1° to the currently set angle.

In Step S66, the control program determines whether the radial tilt angle is within a predetermined measurement range. For example, the control program stores a threshold value of 0.8° in advance and, if the radial tilt angle set in Step S65 exceeds the threshold value (0.8°), the control program determines that the radial tilt angle is not within the measurement range. If the radial tilt angle set in Step S65 is less than or equal to the threshold value (0.8°), the control program determines that the radial tilt angle is within the measurement range.

If the control program determines in Step S66 that the radial tilt angle is within the measurement range, the control program goes back to Step S63 because the control program must determine the signal at a subsequent radial tilt angle. In Step S63, the control program repeats the above steps in terms of the radial tilt angle of the optical pickup 31 set in Step S65.

If the control program determines in Step S66 that the radial tilt angle is not within the measurement range, the control program proceeds to Step S67 because the control program has obtained the signals within the measurement range. In Step S67, the control program detects a largest maximum value among the stored maximum values of the signal. For example, since the maximum values of the signal corresponding to the radial tilt angle for every 0.1 degrees within the range from −0.8° to 0.8° are stored in Step S64, the control program detects a largest maximum value among the maximum values in Step S67.

In Step S68, the control program determines the radial tilt angle corresponding to the detected largest maximum value. In other words, since the maximum value of the signal is stored in association with the radial tilt angle of the optical pickup 31 in Step S64, the control program determines the radial tilt angle of the optical pickup 31 corresponding to the stored largest maximum value detected in Step S67.

Figure 18:
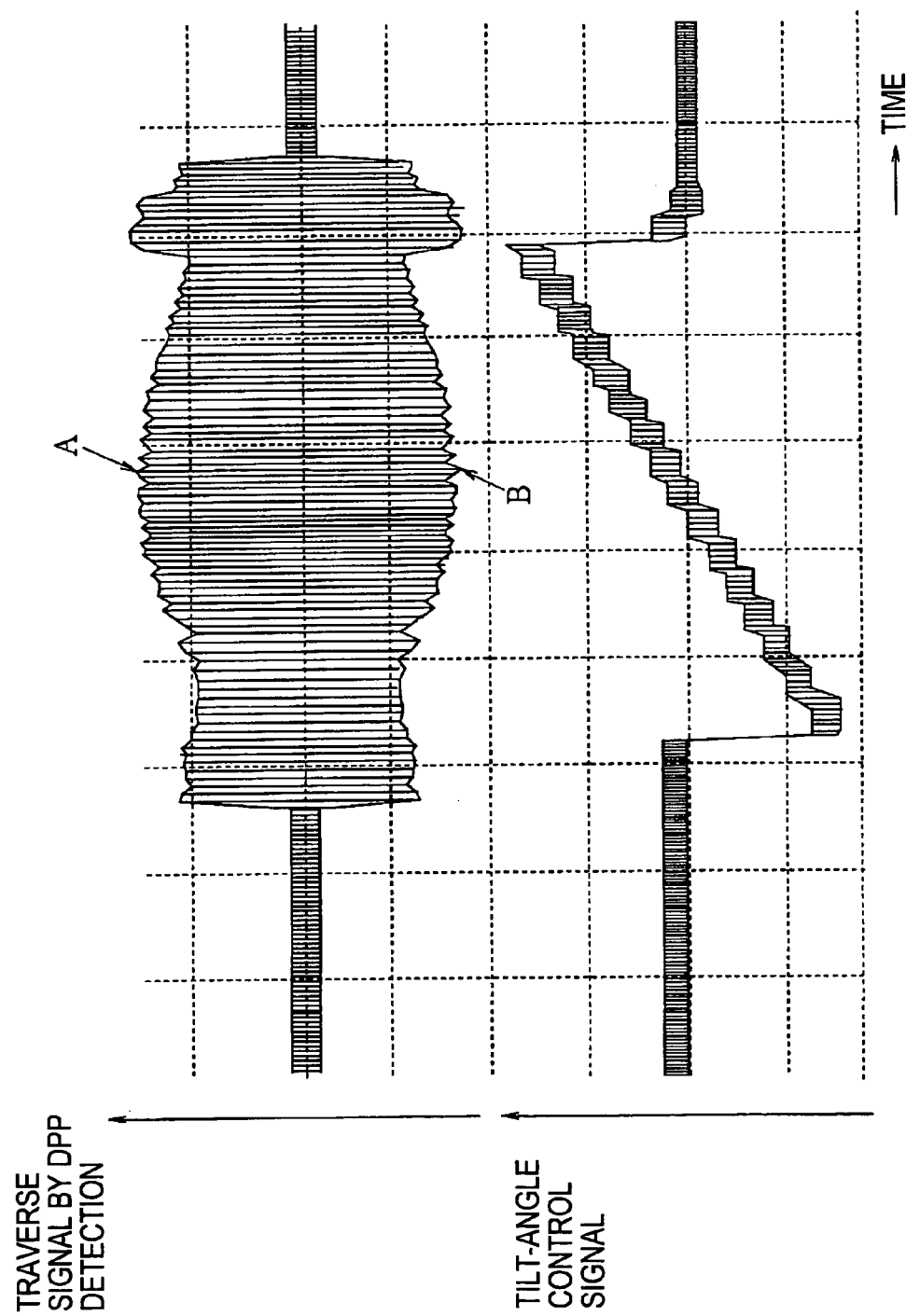
FIG. 18 illustrates examples of a tilt-angle control signal and the traverse signal by DPP detection.

FIG. 18 illustrates examples of the tilt-angle control signal for controlling the radial tilt angle of the optical pickup 31 in the steps from Step S62 to Step S66 and the detected traverse signal by DPP detection, when the traverse signal by DPP detection is selected.

The triaxial driver 34 drives the driver 102-3 in the optical pickup 31 based on the tilt-angle control signal, which is a servo error signal, supplied from the A/D servo controller 33 to control the orientation of the objective lens 61 in the optical pickup 31 in the radial tilt direction. Specifically, the radial tilt angle, which is the angle of the optical axis 75 of the objective lens 61 with respect to the axis 74 that is parallel to the spindle axis 71, is varied based on the value of the tilt-angle control signal.

Referring to FIG. 18, a period during which the tilt-angle control signal is constant (period during which the tilt-angle control signal is not varied) corresponds to a period during which the radial tilt angle is constant and corresponds to a period during which the optical disc 2 rotates by 360° in Step S63.

The values of the traverse signal by DPP detection are varied in the shape of a barrel in accordance with a variation in the tilt-angle control signal, that is, a variation in the radial tilt angle.

For example, when a maximum value of the traverse signal by DPP detection is detected in Step S67 from among values of the traverse signal by DPP detection varying in the shape of the barrel as shown in FIG. 18, a value of the tilt-angle control signal when the maximum value of the traverse signal by DPP detection is obtained, that is, the radial tilt angle is determined in Step S68.

At a radial tilt angle at which the traverse signal by DPP detection has a maximum value (a value shown by A in FIG. 18), the traverse signal by DPP detection also has a minimum value (a value shown by B in FIG. 18). Accordingly, an angle corresponding to the minimum value of the traverse signal by DPP detection may be determined. The determination of the radial tilt angle corresponding to a minimum value of the signal has the same physical meaning as the determination of the radial tilt angle corresponding to a maximum value of the signal.

Figure 19:
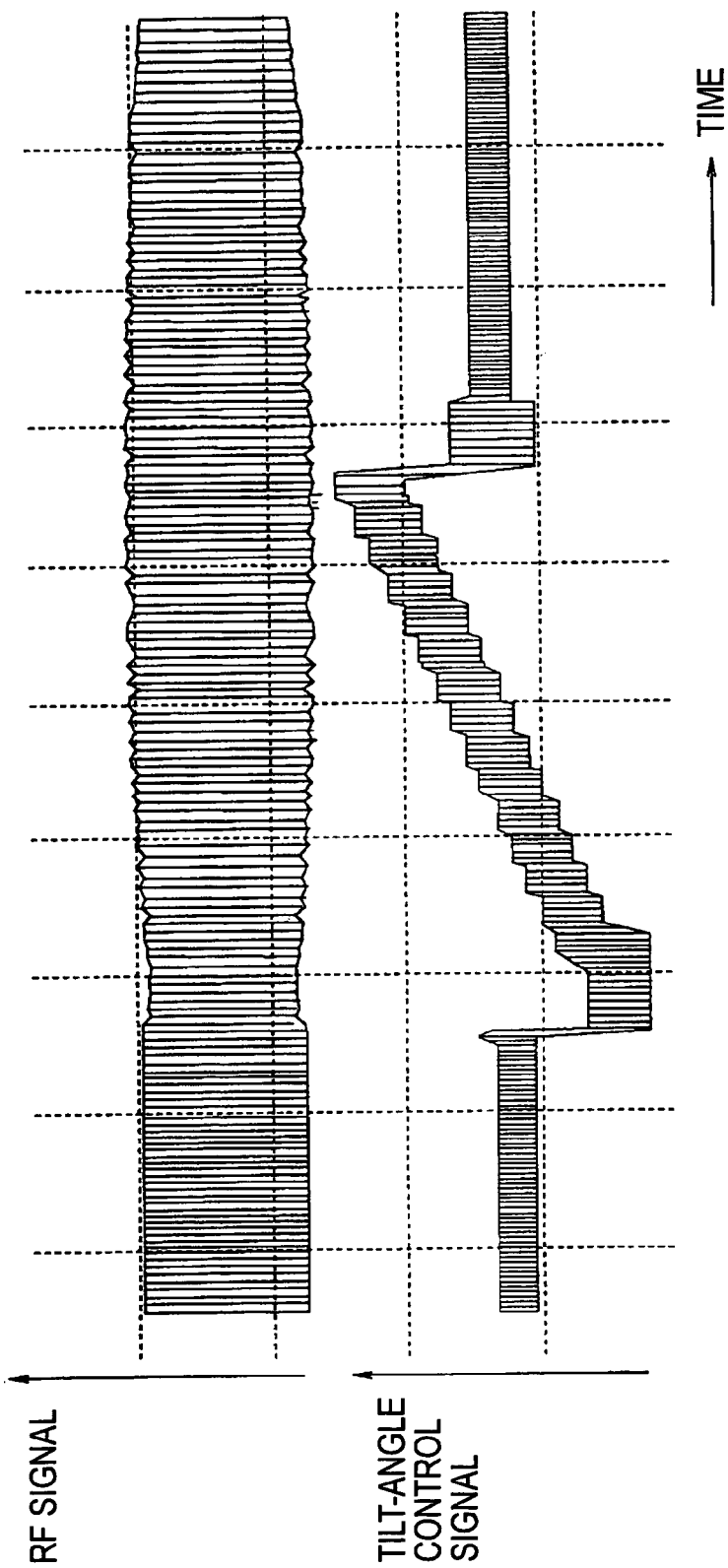
FIG. 19 illustrates examples of the tilt-angle control signal and the RF signal.

FIG. 19 illustrates examples of the tilt-angle control signal for controlling the radial tilt angle of the optical pickup 31 in the steps from Step S62 to Step S66 and the detected RF signal, when the RF signal is selected.

Referring to FIG. 19, as in FIG. 18, a period during which the tilt-angle control signal is constant (period during which the tilt-angle control signal is not varied) corresponds to a period during which the radial tilt angle is constant and corresponds to a period during which the optical disc 2 rotates by 360° in Step S63.

The values of the RF signal are varied in the shape of a barrel in accordance with a variation in the tilt-angle control signal, that is, a variation in the radial tilt angle. Generally, a variation in the RF signal when the optical disc 2 is a DVD-ROM is smaller than a variation in the traverse signal by DPP detection when the optical disc 2 is a DVD-R or the like.

For example, when a maximum value of the RF signal is detected in Step S67 from among values of the RF signal varying in the shape of the barrel as shown in FIG. 19, a value of the tilt-angle control signal when the maximum value of the RF signal is obtained, that is, the radial tilt angle is determined in Step S68.

Referring back to FIG. 15, in Step S68, the control program may determine the radial tilt angle of the optical pickup 31 corresponding to a value within any range that is 80% to 100% of a largest maximum value.

In Step S69, the control program sets the determined radial tilt angle as the radial tilt angle of the inner circumference.

Figure 16:
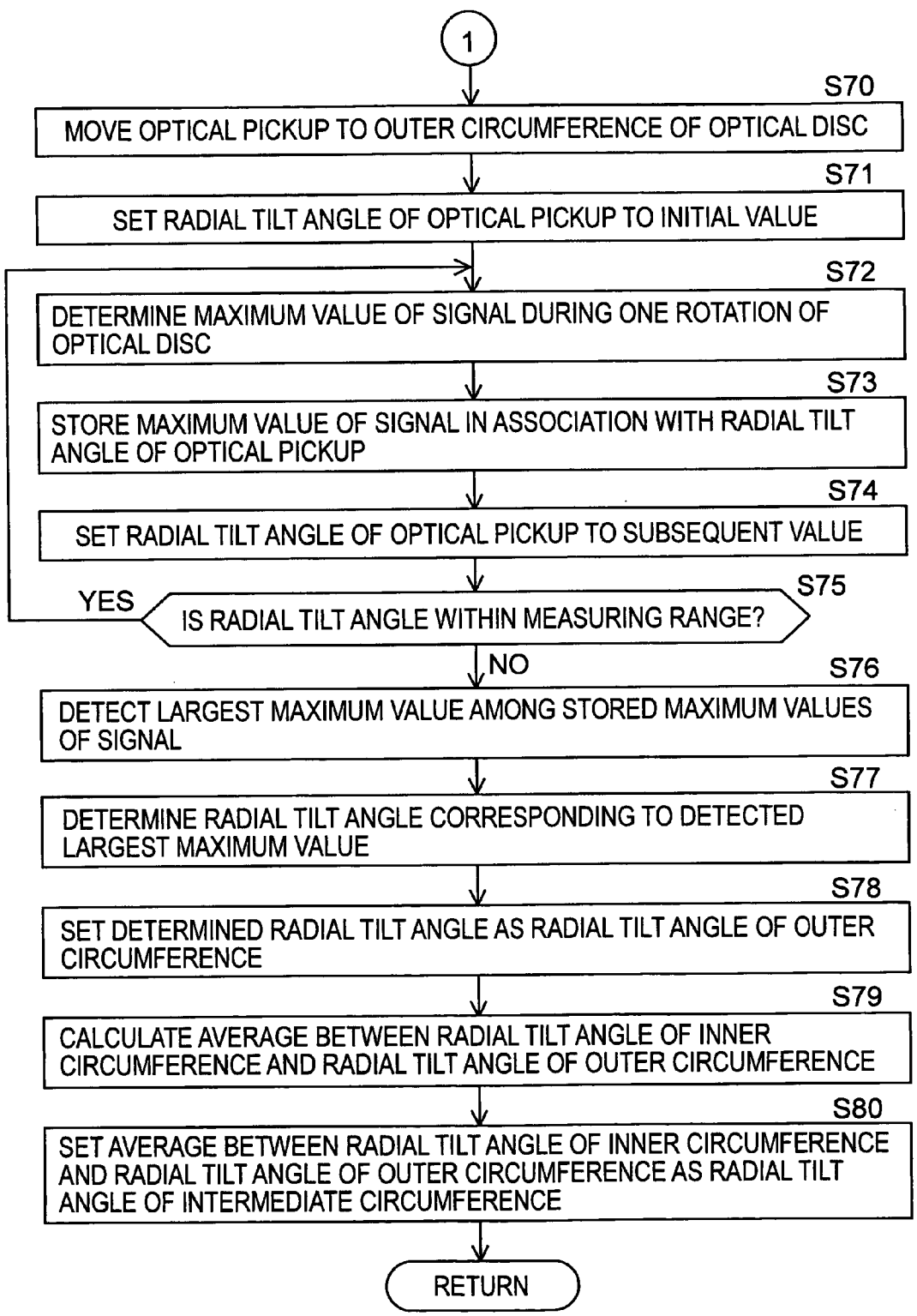
FIG. 16 is a flowchart showing in detail the process of setting the radial tilt angle.

Referring to FIG. 16, in Step S70, the control program controls the triaxial driver 34 to move the optical pickup 31 to the outer circumference of the mounted optical disc 2. The outer circumference of the optical disc 2 means an area that is closer to the lead-out area among data areas on the optical disc 2.

In Step S71, the control program controls the triaxial driver 34 to set the radial tilt angle of the optical pickup 31 to an initial value. For example, in Step S71, the control program controls the triaxial driver 34 to set the radial tilt angle of the optical pickup 31 to an initial value of −0.8°.

In Step S72, the control program determines a maximum value of the signal during one rotation of the optical disc 2. For example, in Step S72, the control program causes the analog-to-digital converter in the A/D servo controller 33 to sample signals at sufficiently short intervals relative to the period of the signal (quantization) and determines a maximum value of the signal among the sampled values during one rotation of the optical disc 2.

The signal here means the signal selected in the process described with reference to the flowchart in FIG. 13, as in Step S63.

In Step S73, the control program stores the maximum value of the signal in association with the radial tilt angle of the optical pickup 31. For example, in Step S73, the control program stores the maximum value of the signal determined in Step S72 in association with the initial value of the radial tilt angle set in Step S71. In iteration of Step S73, the control program stores the maximum value of the signal determined in Step S72 in association with the radial tilt angle to be set in Step S74 described below.

In Step S74, the control program controls the triaxial driver 34 to set the radial tilt angle of the optical pickup 31 to a subsequent value. For example, in Step S74, the control program controls the triaxial driver 34 to set the radial tilt angle of the optical pickup 31 to an angle given by adding 0.1° to the currently set angle, as in Step S65.

In Step S75, the control program determines whether the radial tilt angle is within a measurement range. For example, the control program stores a threshold value of 0.8° in advance and, if the radial tilt angle set in Step S74 exceeds the threshold value (0.8°), the control program determines that the radial tilt angle is not within the measurement range. If the radial tilt angle set in Step S74 is less than or equal to the threshold value (0.8°), the control program determines that the radial tilt angle is within the measurement range.

If the control program determines in Step S75 that the radial tilt angle is within the measurement range, the control program goes back to Step S72 because the control program must determine the signal at a subsequent radial tilt angle. In Step S72, the control program repeats the above steps in terms of the radial tilt angle of the optical pickup 31 set in Step S74.

If the control program determines in Step S75 that the radial tilt angle is not within the measurement range, the control program proceeds to Step S76 because the control program has obtained the signals within the measurement range. In Step S76, the control program detects a largest maximum value from among the stored maximum values of the signal. For example, since the maximum values of the signal corresponding to the radial tilt angle for every 0.1 degree within the range from −0.8° to 0.8° are stored in Step S73, the control program detects a largest maximum value from among the maximum values in Step S76.

In Step S77, the control program determines the radial tilt angle corresponding to the detected largest maximum value. In other words, since the maximum value of the signal is stored in association with the radial tilt angle of the optical pickup 31 in Step S73, the control program determines the radial tilt angle of the optical pickup 31 corresponding to the stored largest maximum value detected in Step S76.

In Step S77, the control program may determine the radial tilt angle of the optical pickup 31 corresponding to a value within any range that is 80% to 100% of a largest maximum value.

In Step S78, the control program sets the determined radial tilt angle to the radial tilt angle of the outer circumference.

As described above, in the steps from Step S71 to Step S78, in terms of the outer circumference of the optical disc 2, the control program performs the steps similar to the steps from Step S62 to Step S69 in terms of the inner circumference of the optical disc 2.

In Step S79, the control program calculates an average between the radial tilt angle of the inner circumference and the radial tilt angle of the outer circumference. For example, in Step S79, the control program calculates an average between the radial tilt angle of the inner circumference set in Step S69 and the radial tilt angle of the outer circumference set in Step S78.

In Step S79, the control program may calculate an average of the radial tilt angles by using, as weights, a distance between a position where the radial tilt angle of the inner circumference is measured and the spindle, a distance between a position where the radial tilt angle of the outer circumference is measured and the spindle, and a distance between the intermediate circumference and the spindle, instead of calculating a simple average between the radial tilt angle of the inner circumference and the radial tilt angle of the outer circumference.

In Step S80, the control program sets the average between the radial tilt angle of the inner circumference and the radial tilt angle of the outer circumference, calculated in Step S79, as the radial tilt angle of the intermediate circumference, and completes the process.

As described above, the optical-disc recording-and-playback apparatus 1 can set the radial tilt angle of the optical pickup 31, at which the optical axis 75 of the objective lens 61 is perpendicular to the axis 73 being contact with the surface of the optical disc 2, for the inner, outer, and intermediate circumferences.

The control program may determine a maximum value by using a moving average in Step S63 or Step S72. In such a case, the effect of a noise can be reduced, thus improving the measurement accuracy.

The measurement range of the radial tilt angle is not limited to the range from −0.8° to 0.8° and may be set to an arbitrary range. Practically, it is preferable to set a range exceeding the specifications of the optical disc 2 as the measurement range.

Figure 20:
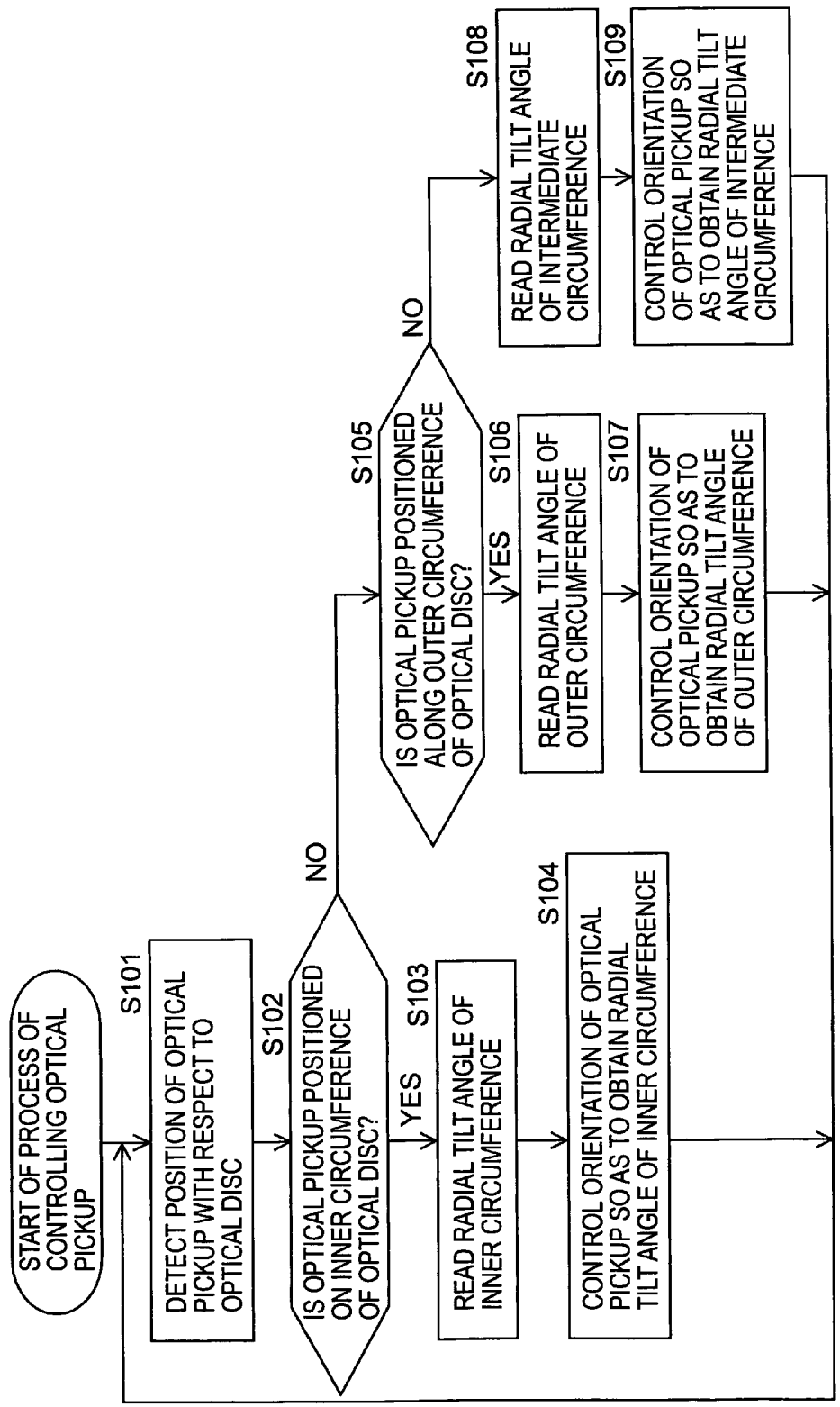
FIG. 20 is a flowchart showing in detail a process of controlling the optical pickup.

FIG. 20 is a flowchart showing in detail the process of controlling the optical pickup 31 to control the orientation of the optical pickup 31 with respect to the optical disc 2 in Step S13 in FIG. 12. In Step S101, the control program detects a position of the optical pickup 31 with respect to the optical disc 2. Specifically, in Step S101, the control program detects whether the optical pickup 31 is positioned on the inner circumference of the optical disc 2, on the intermediate circumference thereof, or on the outer circumference thereof.

In Step S102, the control program determines whether the optical pickup 31 is positioned on the inner circumference of the optical disc 2. If the control program determines that the optical pickup 31 is positioned on the inner circumference of the optical disc 2, the control program proceeds to Step S103 to read the set radial tilt angle of the inner circumference. In Step S104, the control program controls the radial tilt angle of the optical pickup 31 so as to be the radial tilt angle of the inner circumference and goes back to Step S101 to repeat the above steps.

For example, in Step S104, the control program supplies the value of the tilt-angle control signal corresponding to the set radial tilt angle of the inner circumference to the triaxial driver 34. The amplifier 101-3 in the triaxial driver 34 drives the driver 102-3 in the optical pickup 31 to control the orientation of the optical pickup 31 such that the angle of the optical axis 75 of the objective lens 61 with respect to the axis 74 that is parallel to the spindle axis 71 becomes equal to the set radial tilt angle of the inner circumference. As a result, the optical axis 75 of the objective lens 61 is perpendicular to the axis 73 being in contact with the surface of the optical disc 2, thus minimizing the aberration occurring in the light beam.

If the control program determines in Step S102 that the optical pickup 31 is not positioned on the inner circumference of the optical disc 2, the control program proceeds to Step S105 to determine whether the optical pickup 31 is positioned on the outer circumference of the optical disc 2. If the control program determines that the optical pickup 31 is positioned on the outer circumference of the optical disc 2, the control program proceeds to Step S106 to read the set radial tilt angle of the outer circumference. In Step S107, the control program controls the radial tilt angle of the optical pickup 31 so as to be the radial tilt angle of the outer circumference, and goes back to Step S101 to repeat the above steps.

For example, in Step S107, the control program supplies the value of the tilt-angle control signal corresponding to the set radial tilt angle of the outer circumference to the triaxial driver 34. The amplifier 101-3 in the triaxial driver 34 drives the driver 102-3 in the optical pickup 31 to control the orientation of the optical pickup 31 such that the angle of the optical axis 75 of the objective lens 61 with respect to the axis 74 that is parallel to the spindle axis 71 becomes equal to the set radial tilt angle of the outer circumference. As a result, the optical axis 75 of the objective lens 61 is perpendicular to the axis 73 being in contact with the surface of the optical disc 2, thus minimizing the aberration occurring in the light beam.

If the control program determines in Step S105 that the optical pickup 31 is not positioned on the outer circumference of the optical disc 2, the control program proceeds to Step S108 because the optical pickup 31 is positioned on the intermediate circumference. In Step S108, the control program reads the set radial tilt angle of the intermediate circumference. In Step S109, the control program controls the radial tilt angle of the optical pickup 31 so as to be the radial tilt angle of the intermediate circumference, and goes back to Step S101 to repeat the above steps.

For example, in Step S109, the control program supplies the value of the tilt-angle control signal corresponding to the set radial tilt angle of the intermediate circumference to the triaxial driver 34. The amplifier 101-3 in the triaxial driver 34 drives the driver 102-3 in the optical pickup 31 to control the orientation of the optical pickup 31 such that the angle of the optical axis 75 of the objective lens 61 with respect to the axis 74 that is parallel to the spindle axis 71 becomes equal to the set radial tilt angle of the intermediate circumference. As a result, the optical axis 75 of the objective lens 61 is perpendicular to the axis 73 being in contact with the surface of the optical disc 2, thus minimizing the aberration occurring in the light beam.

As described above, the optical-disc driving apparatus according to the present invention controls the orientation of the optical pickup 31 based on the set radial tilt angle. As a result, the orientation of the optical pickup 31 is controlled such that the optical axis 75 of the objective lens 61 is perpendicular to the surface of the optical disc 2 even when the optical disc 2 has radial skew.

Since the orientation of the optical pickup 31 is controlled based on the radial tilt angle set for the inner and outer circumferences, the orientation of the optical pickup 31 is always controlled such that the optical axis 75 of the objective lens 61 is perpendicular to the surface of the optical disc 2 even when the state of the radial skew of the optical disc 2 is varied with positions on the inner and outer circumferences.

Accordingly, only a small amount of aberration always occurs in the light beam. As a result, it is possible to inhibit the S/N ratio of playback signals from degrading during playback, thus inhibiting an occurrence of a jitter. It is possible to generate appropriate marks (pits) during recording.

In Step S108, the control program may calculate the radial tilt angle of the intermediate circumference based on the set radial tilt angle of the inner circumference and the set radial tilt angle of the outer circumference. In this case, Steps S79 and S80 in FIG. 16 are not necessary.

The process described with reference to the flowcharts in FIGS. 15 and 16 is an example in which the data area on the optical disc 2 is divided into the three sub-areas; that is, the inner circumference, the intermediate circumference, and the outer circumference. In the process of setting the radial tilt angle, the data area on the optical disc 2 is not necessarily divided into the three sub-areas. The entire data area may be processed as one area, the data area may be divided into two sub-areas, or the data area may be divided into four or more sub-areas. In these cases, in the process of controlling the optical pickup 31, an area where the optical pickup 31 is positioned is detected, and the orientation of the optical pickup 31 is controlled such that the optical axis 75 is perpendicular to the surface of the optical disc 2 based on the radial tilt angle set for the detected area.

Controlling the orientation of the optical pickup with respect to the optical disc in the manner described above allows the tilt of the optical axis in the radial tilt direction with respect to the optical disc to be corrected. When the traverse signals by DPP detection are detected at the radial tilt angles between the optical disc and the optical pickup within a first range, the radial tilt angle corresponding to a traverse signal by DPP detection within a second range including a maximum value among the values of the detected traverse signals is determined, and the orientation of the optical pickup with respect to the optical disc is controlled based on the determined radial tilt angle, an additional sensor for detecting the radial tilt angle of the optical disc is not necessary. Accordingly, the tilt of the optical axis in the radial tilt direction with respect to the optical disc can be corrected by a simpler process.

The series of processes described above may be executed by hardware or by software. When the series of processes are executed by software, programs constituting the software are installed from a storage medium to a computer included in dedicated hardware or to, for example, a general-purpose personal computer capable of executing various functions by installing various programs.

The storage medium may be a package medium including the magnetic disc 53 (including a flexible disc) having the programs recorded thereon, the optical disc 54 including a compact-disc read-only-memory (CD-ROM) or a DVD, the magneto-optical disc 55 including a mini-disc (MD) (trademark), or the semiconductor memory 56, which are shown in FIG. 1 and which are distributed for supplying the programs to the user in addition to the computer. Alternatively, the storage medium may be a ROM (not shown) or a hard disk (not shown) having the programs recorded thereon, which has been included in the computer in advance and is supplied to the user.

The programs that execute the series of processes described above may be installed in a computer through an interface including a router or a modem, as required, over a wired or wireless communication medium, such as a local area network, the Internet, or digital satellite broadcasting.

In this specification, the steps describing the programs stored in the storage medium correspond not only to processing performed sequentially in time series but also to processing performed in parallel or individually.

While the invention has been described in its preferred embodiments, it will be understood by those skilled in the art that the words which have been used are words of description rather than limitation and that various changes and modifications may be made to the invention without departing from the spirit and scope thereof.

What is claimed is:

1. An optical-disc driving apparatus for an optical disc, the apparatus comprising:
   a pickup;
   a detection unit for detecting a traverse signal by differential push pull (DPP) detection for every radial tilt angle within a first range, the radial tilt angle being measured between the optical disc and the pickup;
   a determination unit for determining the radial tilt angle corresponding to a traverse signal within a second range including a maximum value among the detected traverse signals; and
   a control unit for controlling an orientation of the pickup with respect to the optical disc based on the radial tilt angle determined by the determination unit,
   wherein the optical-disc driving apparatus controls driving of the optical disc based on the traverse signal by DPP detection generated from a preceding beam, a main beam, and a succeeding beam.

2. The optical-disc driving apparatus according to claim 1,
   wherein the detection unit detects the maximum value of the traverse signal for every radial tilt angle within the first range from among values of the traverse signal detected during a predetermined period, and
   wherein the determination unit determines the radial tilt angle corresponding to a traverse signal within the second range including a largest maximum value among the detected maximum values of the traverse signal.

3. The optical-disc driving apparatus according to claim 2,
   wherein the detection unit detects the maximum value of the traverse signal for every radial tilt angle within the first range from among values of the traverse signal during one rotation of the optical disc.

4. The optical-disc driving apparatus according to claim 1, further comprising:
   a selection unit for selecting either the traverse signal or an RF signal generated from the main beam in accordance with a type of the optical disc,
   wherein the detection unit detects the traverse signal for every radial tilt angle within the first range when the traverse signal is selected, and detects the RF signal for every radial tilt angle within the first range when the RF signal is selected, and
   wherein the determination unit determines the radial tilt angle corresponding to the traverse signal within the second range including the maximum value among the detected traverse signals when the traverse signal is selected, and determines the radial tilt angle corresponding to an RF signal within a third range including the maximum value among the detected RF signals when the RF signal is selected.

5. The optical-disc driving apparatus according to claim 4,
   wherein the selection unit selects either the traverse signal or the RF signal in accordance with the type of the optical disc based on one of a number of layers on the optical disc, a reflectance of the optical disc, and a level of the traverse signal obtained by push-pull detection.

6. The optical-disc driving apparatus according to claim 1,
   wherein the detection unit detects the traverse signal for every radial tilt angle within the first range at an inner-circumference-side area on the optical disc and at an outer-circumference-side area on the optical disc,
   wherein the determination unit determines the radial tilt angle corresponding to the traverse signal within the second range including the maximum value among the traverse signals at the inner-circumference-side area and the outer-circumference-side area, and
   wherein the control unit controls the orientation of the pickup with respect to the optical disc based on the radial tilt angles determined at the inner-circumference-side area and at the outer-circumference-side area.

7. The optical-disc driving apparatus according to claim 6, further comprising:
   a storage unit for storing the radial tilt angles determined at the inner-circumference-side area and at the outer-circumference-side area,
   wherein the control unit controls the orientation of the pickup with respect to the optical disc based on the stored radial tilt angles.

8. The optical-disc driving apparatus according to claim 6, further comprising:
   a calculation unit for calculating a radial tilt angle within another area based on the radial tilt angles determined at the inner-circumference-side area and at the outer-circumference-side area,
   wherein the control unit controls the orientation of the pickup with respect to the optical disc based on the radial tilt angles determined at the inner-circumference-side area and at the outer-circumference-side area or the calculated radial tilt angle within the other area.

9. A method of driving an optical disc by controlling driving of the optical disc based on a traverse signal obtained by differential push-pull (DPP) detection generated from a preceding beam, a main beam, and a succeeding beam, the method comprising the steps of:
   controlling detecting of the traverse signal by DPP detection for every radial tilt angle within a first range, the radial tilt angle being measured between the optical disc and a pickup;
   determining the radial tilt angle corresponding to a traverse signal within a second range including a maximum value among detected traverse signals; and
   controlling an orientation of the pickup with respect to the optical disc based on the radial tilt angle obtained in the step of determining.

10. A storage medium that stores a recorded computer-readable program for a process of controlling driving of an optical disc based on a traverse signal obtained by differential push-pull (DPP) detection generated from a preceding beam, a main beam, and a succeeding beam, the program comprising the steps of:
    controlling detecting of the traverse signal by DPP detection for every radial tilt angle within a first range, the radial tilt angle being measured between the optical disc and a pickup;
    determining the radial tilt angle corresponding to a traverse signal within a second range including a maximum value among detected traverse signals; and
    controlling an orientation of the pickup with respect to the optical disc based on the radial tilt angle obtained in the step of determining.

11. A program causing a computer to perform a process of controlling driving of an optical disc based on a traverse signal obtained by differential push-pull (DPP) detection generated from a preceding beam, a main beam, and a succeeding beam, the program comprising the steps of:

controlling detecting of the traverse signal by DPP detection for every radial tilt angle within a first range, the radial tilt angle being measured between the optical disc and a pickup;

determining the radial tilt angle corresponding to a traverse signal within a second range including a maximum value among detected traverse signals; and controlling an orientation of the pickup with respect to the optical disc based on the radial tilt angle obtained in the step of determining.

* * * * *